US008628250B2

(12) United States Patent
Oinuma et al.

(10) Patent No.: US 8,628,250 B2
(45) Date of Patent: Jan. 14, 2014

(54) SUPPORT DEVICE FOR SUPPORTING PROPELLER SHAFT AND PROPELLER SHAFT ITSELF

(75) Inventors: Masanori Oinuma, Machida (JP); Hidekazu Aoki, Atsugi (JP); Takahiro Kuroha, Atsugi (JP); Takayuki Yokota, Narita (JP); Hiromichi Komai, Atsugi (JP); Yoshimichi Takano, Atsugi (JP)

(73) Assignee: Hitchi, Ltd., Tokyo (JP)

( * ) Notice: Subject to any disclaimer, the term of this patent is extended or adjusted under 35 U.S.C. 154(b) by 953 days.

(21) Appl. No.: 12/126,233

(22) Filed: May 23, 2008

(65) Prior Publication Data

US 2008/0293502 A1    Nov. 27, 2008

(30) Foreign Application Priority Data

May 25, 2007  (JP) ................................. 2007-138703
Mar. 21, 2008  (JP) ................................. 2008-074001

(51) Int. Cl.
*F16C 27/04* (2006.01)
*F16C 33/76* (2006.01)

(52) U.S. Cl.
USPC ............ 384/536; 384/484; 180/381; 277/551

(58) Field of Classification Search
USPC ......... 384/477, 484, 486, 535, 536, 581, 582; 180/381; 277/551, 571
See application file for complete search history.

(56) References Cited

U.S. PATENT DOCUMENTS

| | | | | |
|---|---|---|---|---|
| 2,102,415 A | * | 12/1937 | Herreshoff | 384/536 |
| 2,238,737 A | * | 4/1941 | Hunter | 180/381 |
| 3,337,221 A | * | 8/1967 | Hulsebus et al. | 277/571 |
| 3,482,844 A | * | 12/1969 | McKinven, Jr. | 277/349 |
| 3,658,395 A | * | 4/1972 | Hallerback | 384/484 |
| 4,093,324 A | * | 6/1978 | Carrigan | 384/480 |
| 5,004,248 A | * | 4/1991 | Messenger et al. | 277/351 |
| 6,220,600 B1 | * | 4/2001 | Tripathy et al. | 277/309 |
| 6,276,837 B1 | * | 8/2001 | Iwano | 384/536 |
| 6,573,705 B1 | | 6/2003 | Tajima et al. | |
| 6,913,105 B2 | * | 7/2005 | Masuda et al. | 180/381 |
| 2007/0132195 A1 | * | 6/2007 | Ishii | 277/562 |

FOREIGN PATENT DOCUMENTS

| | | |
|---|---|---|
| JP | 06-051632 U | 7/1994 |
| JP | 08-198109 A | 8/1996 |
| JP | 2001-082979 A | 3/2001 |
| JP | 2001-099327 A | 4/2001 |
| JP | 2006-207620 A | 8/2006 |
| JP | 2006-250251 A | 9/2006 |

* cited by examiner

*Primary Examiner* — Thomas Diaz
(74) *Attorney, Agent, or Firm* — Foley & Lardner LLP

(57) ABSTRACT

A support device of a propeller shaft comprises an annular bracket fixed to a floor member of a vehicle body; an annular elastic member disposed in the annular bracket; an annular supporting structure disposed in the annular elastic member and rotatably supporting a cylindrical given portion of the propeller shaft through a ball bearing unit; and an annular seal member intimately disposed in an annular space defined between the annular supporting structure and the cylindrical given portion of the propeller shaft. One of outer and inner cylindrical surfaces of the annular seal member is in slidable contact with either one of an inner cylindrical surface of the annular supporting structure and an outer cylindrical surface of the cylindrical given portion of the propeller shaft. A rust-proofing member is further provided, which is disposed on either one of the inner cylindrical surface of the annular supporting structure and the outer cylindrical surface of the cylindrical given portion of the propeller shaft, to which the outer or inner cylindrical surface of the annular seal member directly and slidably contacts. The rust-proofing member is made of a rust-resistant material.

9 Claims, 36 Drawing Sheets

SUPPORT DEVICE FOR SUPPORTING PROPELLER SHAFT AND PROPELLER SHAFT ITSELF

BACKGROUND OF THE INVENTION

1. Field of the Invention

The present invention relates in general to a support device for a propeller shaft of motor vehicle and the propeller shaft itself. More specifically, the present invention is concerned with the support devices of a type that supports the propeller shaft to a vehicle body through an annular ball bearing.

2. Description of the Related Art

In order to clarify the present invention, the background of the propeller shaft support devices of the above-mentioned type will be briefly described in the following.

One of the support devices of such type is disclosed in Japanese Laid-open Patent Application (Tokkai) 2006-250251, particularly FIGS. 1 and 2 of the same.

That is, the disclosed support device comprises generally an annular bracket member that is fixed to a floor of a vehicle, an annular elastic member that is concentrically disposed in the annular bracket member, an annular bearing unit that is concentrically disposed in the annular elastic member and rotatably supports a propeller shaft, an annular stopper metal piece that is concentrically disposed on the propeller shaft and has an annular base part pressed against one axial end of the bearing unit to achieve positioning and fixing of the bearing unit relative to the propeller shaft, and an annular seal member that has a cylindrical outer surface secured to a cylindrical inner surface of the annular elastic member and a cylindrical inner surface slidably but sealingly put on a cylindrical outer surface of the annular base part of the annular stopper metal piece.

The annular elastic member comprises an outer annular part fixed to the annular bracket member, an inner annular part covering both the bearing unit and the seal member and a turn-up part at which the outer and inner annular parts are integrally connected.

The annular stopper metal piece comprises a smaller diameter inner part (viz., the annular base part) press-fitted on the propeller shaft, an annular flange part radially outwardly projecting from one axial end of the smaller diameter inner part and a larger diameter outer part extending from a peripheral end of the annular flange part toward the bearing unit. Thus, the stopper metal piece rotates together with the propeller shaft like a one unit.

The inner annular part of the annular elastic member is formed, at a larger diameter portion thereof facing a leading end of the larger diameter outer part of the annular stopper metal piece, with an annular recess.

A radially inner edge of the annular recess is formed into a tapered guide portion of which diameter gradually increases as a distance to the leading end of the larger diameter outer part of the annular stopper metal piece reduces.

Furthermore, the inner annular part of the annular elastic member is formed, at a smaller diameter portion thereof facing the annular flange part of the annular stopper metal piece, with an annular lip.

That is, a so-called labyrinth structure is constituted by the larger diameter outer part of the annular stopper metal piece and the larger and smaller diameter portions of the inner annular part of the annular elastic member. With this labyrinth structure, undesired penetration of water, such as rainwater, muddy water and the like, toward the smaller diameter inner part of the annular stopper metal piece is suppressed.

SUMMARY OF THE INVENTION

However, due to the nature of the annular elastic member, the labyrinth structure tends to lower its performance as the time passes. Thus, after long use, the undesired water penetration toward and to the smaller diameter inner part of the stopper metal piece tends to occur, which inevitably causes undesired rust produced on the cylindrical outer surface of the annular base part (viz., the smaller diameter inner part) of the annular stopper metal piece.

If the cylindrical outer surface of the annular base part of the annular stopper metal piece is rusted, the sealing performance of the annular seal member against the cylindrical outer surface of the annular base part is lowered, and thus, it tends to occur that the water enters and attacks the bearing unit.

Of course, this attack damages the bearing unit.

It is therefore an object of the present invention to provide a support device of propeller shaft, which is free of the above-mentioned drawback.

According to the present invention, there is provided a support device of propeller shaft, which is constructed to prevent penetration of water into a sealing structure thereby to protect a bearing unit from water and thus from rust.

According to the present invention, there is provided a support device of propeller shaft, in which for assuring a sealing function of an annular seal member, a cylindrical surface to which an inner or outer cylindrical surface of the annular seal member slidably contacts is applied with a rust-proofing member. The rust-proofing member is made of a stainless steel, an engineering plastic, a metal plated on the cylindrical surface, or the like. If desired, the cylindrical surface may be a surface of an annular dust cover that is made of a rust-proofing material.

In accordance with a first aspect of the present invention, there is provided a support device of a propeller shaft, which comprises an annular bracket adapted to be fixed to a floor member of a vehicle body; an annular elastic member disposed in the annular bracket; an annular supporting structure that is disposed in the annular elastic member and rotatably supports a cylindrical given portion of the propeller shaft through a ball bearing unit; an annular seal member intimately disposed in an annular space defined between the annular supporting structure and the cylindrical given portion of the propeller shaft, one of outer and inner cylindrical surfaces of the annular seal member being in slidable contact with either one of an inner cylindrical surface of the annular supporting structure and an outer cylindrical surface of the cylindrical given portion of the propeller to shaft; and a rust-proofing member disposed on either one of the inner cylindrical surface of the annular supporting structure and the outer cylindrical surface of the cylindrical given portion of the propeller shaft, to which the outer or inner cylindrical surface of the annular seal member directly and slidably contacts, the rust-proofing member being made of a rust-resistant material.

In accordance with a second aspect of the present invention, there is provided a support device for supporting a propeller shaft to a vehicle body. The propeller shaft transmits a torque from a power source to a final reduction gear. The support device comprising an annular bracket adapted to be fixed to a floor member of the vehicle body; an annular elastic member disposed in the annular bracket; an annular supporting structure that is disposed in the annular elastic member and rotatably supports a cylindrical given portion of the propeller shaft through a ball bearing unit; an annular seal member intimately disposed in an annular space defined between the annular supporting structure and the cylindrical given portion of the propeller shaft, an inner cylindrical surface of the annular seal member being in slidable contact with an outer cylindrical surface of the cylindrical given portion of the propeller shaft; and a rust-proofing member provided on the outer cylindrical surface of the cylindrical given portion of the propeller shaft, to which the inner cylindrical surface of the annular seal member directly and slidably contacts, the rust-proofing member being made of a rust-resistant material.

In accordance with a third aspect of the present invention, there is provided a propeller shaft for transmitting a torque from a power source to a final reduction gear of a motor vehicle. The transmission comprises a first shaft adapted to be connected to the power source; a second shaft adapted to be connected to the final reduction gear, the second shaft being adapted to be supported by a floor member of the motor vehicle through a support device; a universal joint portion that universally joints the first and second shafts; two rust-proofing cylindrical members arranged at axially spaced portions of the support device and disposed about one of the first and second shafts; two annular seal members respectively received in respective annular spaces each being defined between one of the rust-proofing cylindrical members and a corresponding annular inner surface of the support device, each annular seal member slidably contacting an outer surface of the corresponding rust-proofing cylindrical member.

BRIEF DESCRIPTION OF THE DRAWINGS

Other objects and advantages of the present invention will become apparent from the following description when taken in conjunction with the accompanying drawings, in which.

DETAILED DESCRIPTION OF EMBODIMENTS

In the following, various embodiments of the present invention, which are support devices of a propeller shaft, will be described in detail with reference to the accompanying drawings.

For ease of description, various directional terms, such as, right, left, upper, lower, rightward and the like are used in the following description. However, such terms are to be understood with respect to only a drawing or drawings on which a corresponding portion or part is shown.

It is to be noted that the propeller shafts to which the support device of the present invention is practically applied are those which are commonly employed in a four-wheel-drive vehicle, front-engine-rear-drive vehicle and the like.

Referring to FIGS. 1 to 4B, there is shown a first embodiment E-1 of the present invention, which is a support device 4 for a propeller shaft.

Figure 1:
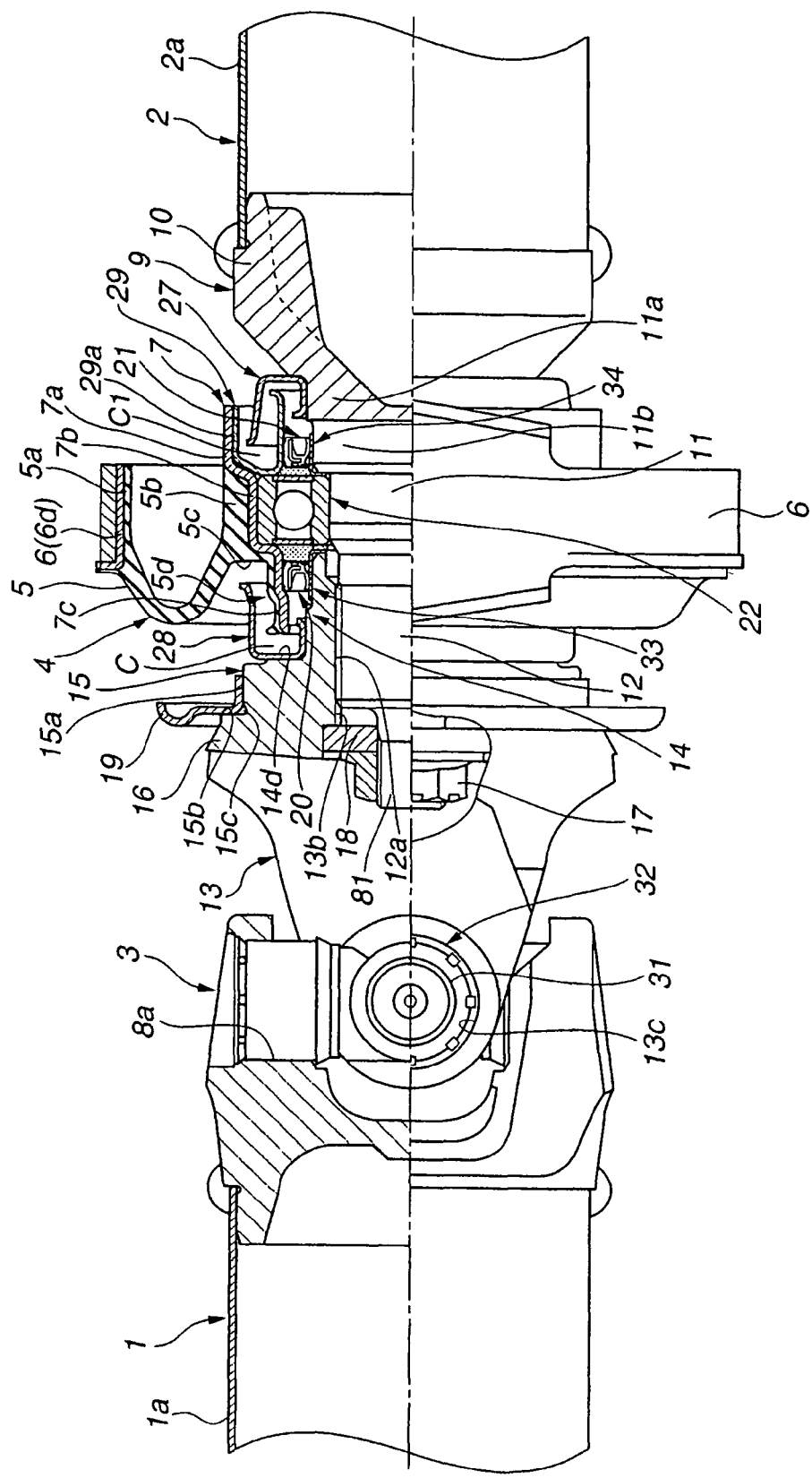
FIG. 1 is a partially sectioned side view of a support device of propeller shaft, which is a first embodiment of the present invention.

As is seen from FIG. 1, the propeller shaft to which the present invention, viz., the support device, is practically applied is of a type that comprises a drive shaft 1 that is driven by a transmission (not shown), a driven shaft 2 that is connected to a differential gear (not shown), and a universal joint 3 (or Cardan joint) through which drive and driven shafts 1 and 2 are universally connected.

As is seen from FIG. 1, support device 4 of the first embodiment E-1 is constructed to support driven shaft 2 at a portion near universal joint 3. Although not shown in the drawings, support device 4 is fixed to a floor member of an associated vehicle body, for example, a lower surface of a cross member of the vehicle body.

As shown in FIG. 1, drive shaft 1 comprises a drive side tube 1a made of a steel pipe and a drive side yoke 8 welded to a right end (or rear end) of drive side tube 1a. Drive side yoke 8 constitutes part of universal joint 3.

Driven shaft 2 comprises a driven side tube 2a made of a steel pipe, a stub shaft 9 welded to a left end (or front end) of driven side tube 2a, and a driven side yoke 13 fixed to a left end (or front end) of stub shaft 9. Driven side yoke 13 is operatively connected to drive side yoke 8 to constitute universal joint 3.

As will become apparent as the description proceeds, support device 4 of the invention is constructed to support a given portion of stub shaft 9.

Stub shaft 9 is made of a ferrous metal and has a plurality annular steps formed therearound. That is, stub shaft 9 comprises a larger diameter right (or rear) portion 10 that is fixed to the front end of driven side tube 2a, a medium diameter middle portion 11 whose rear end is connected to larger diameter right portion 10 through a conical portion (no numeral), and a smaller diameter left (or front) portion 12 that is directed toward drive shaft 1.

In the following, the detailed construction of support device 4 of the first embodiment will be described with reference to FIGS. 1 and 3, particularly FIG. 3.

Figure 3:
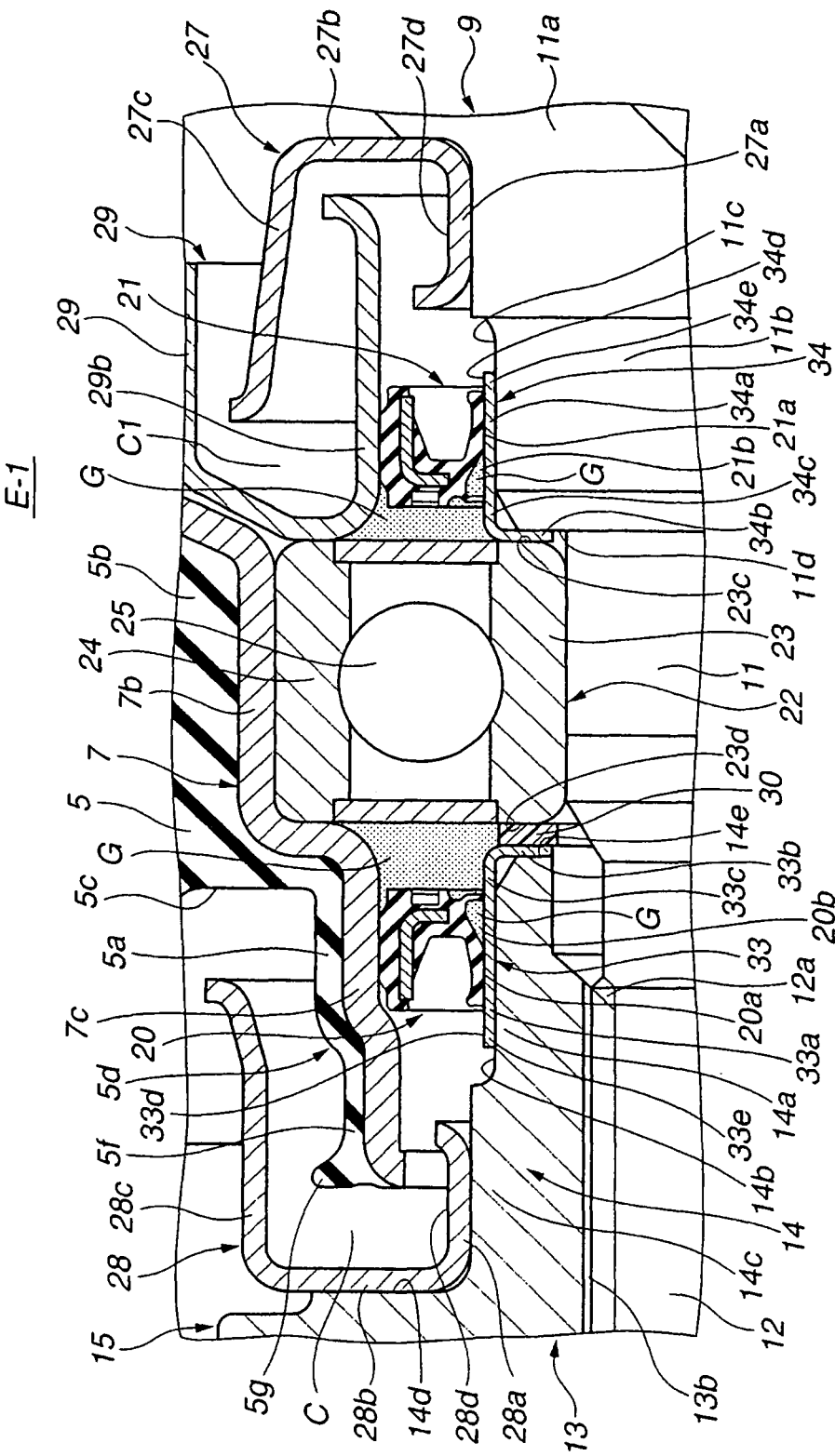
FIG. 3 is an enlarged sectional view of an essential part of the support device of the first embodiment of the present invention.

As is seen from FIGS. 1 and 3, between larger diameter right portion 10 and medium diameter middle portion 11 of stub shaft 9, there is defined a cylindrical portion 11a whose diameter is smaller than that of right portion 10 but larger than that of middle portion 11.

As is best seen from FIG. 3, between cylindrical portion 11a and middle portion 11 of stub shaft 9, there is defined a cylindrical portion 11b whose diameter is smaller than that of cylindrical portion 11a but larger than that of middle portion 11.

Around middle portion 11 of stub shaft 9, there is disposed a radial ball bearing unit 22. As will be clarified hereinafter, radial ball bearing unit 22 constitutes part of the support device 4 of the invention.

Around cylindrical portion 11a of stub shaft 9, there is tightly disposed a first annular dust cover 27 that functions to prevent direct attack of dusts against radial ball bearing unit 22. A press-fitting technique may be used for tightly disposing the first dust cover 27 on the cylindrical portion 11a.

Around cylindrical portion 11b of stub shaft 9, there is arranged an annular seal member 21 that comprises an annular elastic (or rubber) body and a core member embedded in the body.

As will be apparent hereinafter, annular seal member 21 and an after-mentioned annular seal member 20 are stationary members that are held by an annular bracket 6 through annular elastic member 5 (see FIG. 1).

As is best seen from FIG. 3, smaller diameter left portion 12 of stub shaft 9 is formed with serrations 12a therearound.

First annular dust cover 27 is made of a ferrous metal and has a generally U-shaped cross section. That is, first annular dust cover 27 comprises an inner cylindrical portion 27a that is press-fitted on cylindrical portion 11a of stub shaft 9, an annular flange portion 27b that extends radially outward from a right end of inner cylindrical portion 27a and an outer cylindrical portion 27c that extends leftward (viz., toward radial ball bearing unit 22) from a periphery of annular flange portion 27b. Each of inner and outer cylindrical portions 27a and 27c has a left end bent radially outward.

That is, first annular dust cover 27 is disposed on cylindrical portion 11a in such a manner that an annular groove defined by the three portions 27a, 27b and 27c faces toward radial ball bearing unit 22. Thus, first annular dust cover 27 rotates together with stub shaft 9 like a single unit.

As shown in FIG. 3, a right end portion of driven side yoke 13 is formed, around an inner cylindrical wall thereof, with serrations 13b that are operatively engaged with the above-mentioned serrations 12a of smaller diameter left portion 12 of stub shaft 9.

It is thus to be noted that driven side yoke 13 and stub shaft 9 rotate together like a single unit while permitting a slight axial displacement therebetween.

Furthermore, as is seen from FIG. 1, driven side yoke 13 is tightly connected to the left end of stub shaft 9 by means of a plug 18 and a nut 17 meshed with an externally threaded left end portion projected leftward from smaller diameter left portion 12 of stub shaft 9.

As is seen from FIGS. 1 and 3, driven side yoke 13 has at a right end portion thereof a plurality of annular steps formed therearound. That is, driven side yoke 13 comprises a smaller diameter portion 14 that constitute a shaft part, a medium diameter middle portion 15 that is raised radially outward from a left end portion of smaller diameter portion 14, and a larger diameter portion 16 that is raised radially outward from a left end portion of middle portion 15.

As is seen from FIG. 3, smaller diameter portion 14 comprises a smaller diameter right end portion 14a, a slightly larger diameter portion 14c that extends leftward from smaller diameter right end portion 14a and an annular back portion 14d that projects radially outward from a left end of slightly larger diameter portion 14c.

Around slightly larger diameter portion 14c of driven side yoke 13, there is tightly disposed a second annular dust cover 28 that functions to prevent direct attack of dusts against radial ball bearing unit 22. As will be described in detail hereinafter, an annular flange portion 28b of second annular dust cover 28 is in contact with annular back portion 14d of driven side yoke 13.

Second annular dust cover 28 is made of a ferrous metal and has a generally U-shaped cross section. That is, second annular dust cover 28 comprises an inner cylindrical portion 28a that is press-fitted on slightly larger diameter portion 14c of driven side yoke 13, an annular flange portion 28b that extends radially outward from left end of inner cylindrical portion 28a and an outer cylindrical portion 28c that extends rightward (viz., toward radial ball bearing unit 22) from a periphery of annular flange portion 28b. Each of inner and outer cylindrical portions 28a and 28c has a left end bent radially outward.

That is, second annular dust cover 28 is disposed on slightly larger diameter portion 14c in such a manner that an annular groove defined by the three portions 28a, 28b and 28c faces toward radial ball bearing unit 22. Thus, second annular dust cover 28 rotates together with driven side yoke 13 like a single unit.

Around smaller diameter right end portion 14a of driven side yoke 13, there is disposed an annular seal member 20 that comprises an annular elastic (or rubber) body and a core member embedded in the body.

As shown in FIG. 3, each of annular seal members 20 and 21 is formed, around an inner surface 20a or 21a thereof, with an annular recess 20a or 21a that holds a certain amount of grease "G" received therein.

Due to provision of annular seal members 20 and 21 that are respectively provided around cylindrical portion 11b of stub shaft 9 and smaller diameter right end portion 14a of driven side yoke 13, undesired penetration of water into radial ball bearing unit 22 is suppressed. Due to presence of the grease "G", inner surfaces 20a and 21a of annular seal members 20 and 21 are suppressed from abrasion.

As is seen from FIG. 1, medium diameter middle portion 15 of drive side yoke 13 comprises an annular step portion 15a and an annular back portion 15b that extends radially outward from a left end of annular step portion 15a.

Around annular step portion 15a, there is tightly disposed or press-fitted an annular water-block plate 19 that functions to block splashed muddy water thereby to prevent the muddy water from directly attacking radial ball bearing unit 22. As is known, under cruising of a vehicle in the rain, the vehicle has many chances to splash muddy water. As shown at a boundary part between annular step portion 15a and annular back portion 15b, there is formed an annular groove 15c.

As is seen from FIG. 1, universal joint 3 comprises the above-mentioned drive side and driven side yokes 8 and 13 and further elements that are arranged between these two yokes 8 and 13.

That is, as is seen from FIG. 1, the further elements comprise a joint cross 31 that is arranged between the two yokes 8 and 13, bearing holding bores 8a formed in a right end of yoke 8, bearing holding bores 13c formed in a left end of yoke 13, and two pairs of needle bearing units 32 and 32 received in the bores 8a and 13c for rotatably supporting journal shafts of the joint cross 31.

Figure 2:
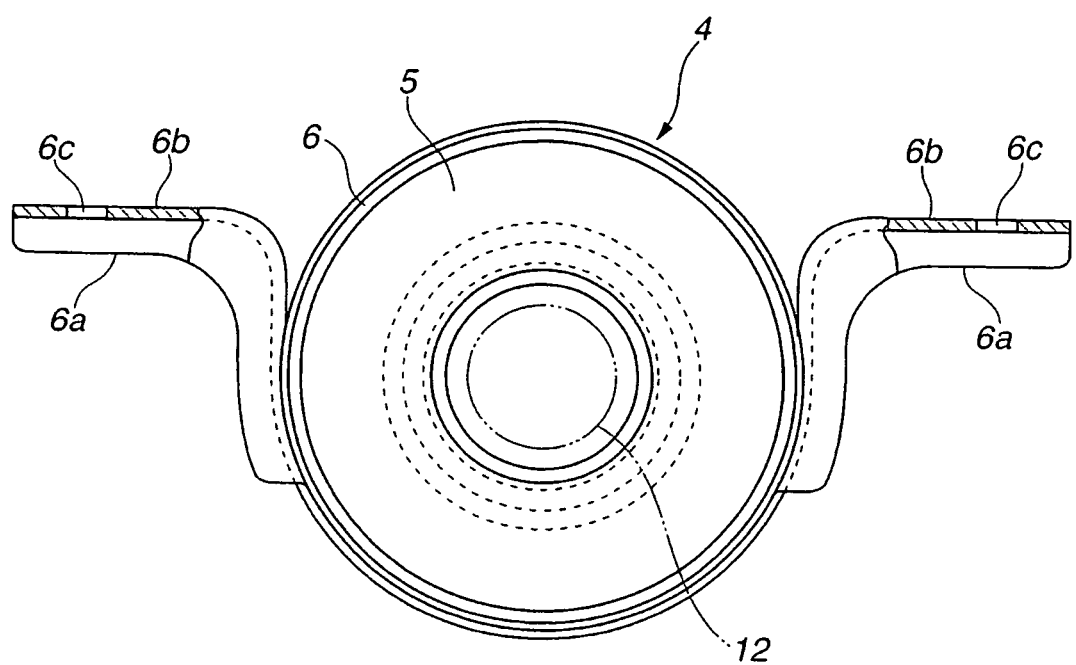
FIG. 2 is a partially sectioned front view of the support device of propeller shaft of the first embodiment of the present invention.

As will be understood from FIGS. 1 and 2, support device 4 generally comprises an annular bracket 6 that is fixed through two leg portions 6a and 6a to a lower surface of a floor member of a vehicle body (not shown). Support device 4 further comprises an annular elastic member 5 installed inside annular bracket 6, a cylindrical casing 7 installed inside annular elastic member 5, and the above-mentioned radial ball bearing unit 22 installed inside cylindrical casing 7.

As is seen from FIG. 2, leg portions 6a have each a generally U-shape and project radially outward in opposite directions from annular bracket 6. Each leg portion 6a has a flat surface 6b that is to be in contact with the lower surface of the vehicle floor member. Furthermore, each leg portion 6a has at the flat surface 6b a bolt opening 6c through which a stud bolt (not shown) passes for tightly connecting the leg portion 6a to the vehicle floor member.

As is seen from FIG. 1, annular elastic member 5 is constructed of a rubber material and comprises an outer annular part 5a that is bonded through vulcanization to an inner surface of an annular metal ring 6d press-fitted in annular bracket 6 and an inner annular part 5b that is bonded through vulcanization to an outer surface of cylindrical casing 7, and a turn-up part (no numeral) at which outer and inner annular parts 5a and 5b are integrally connected.

As is best seen from FIG. 3, inner annular part 5b is formed, at a part facing second annular dust cover 28, with an annular flat surface 5c. Furthermore, a cylindrical left portion 5d expands leftward (viz., toward second dust cover 28) from a radially inward end of annular flat surface 5c.

As shown, cylindrical left portion 5d comprises a larger diameter portion 5e placed near annular flat surface 5c, a smaller diameter portion 5e extending leftward from larger diameter portion 5e and an annular raised portion 5g projecting radially outward from a left end of smaller diameter portion 5e.

As shown, outer cylindrical portion 28c of second annular dust cover 28 concentrically surrounds cylindrical left portion 5d of annular elastic member 5 leaving a given path "C" therebetween, the given path "C" having a generally U-shaped cross section as shown. That is, a left end portion cylindrical left portion 5d is neatly received in an annular groove (no numeral) defined by portions 28a, 28b and 28c of second annular dust cover 28, which protects radial ball bearing unit 22 and its neighboring parts from a direct attack of splashed muddy water.

Furthermore, as shown, due to its complicated shape, the given path "C" constitutes a so-called labyrinth structure. Thus, the muddy water blocking function is much promoted.

Cylindrical casing 7 is made of metal and has a plurality of annular steps formed therearound.

That is, as is seen from FIGS. 1 and 3, cylindrical casing 7 comprises a larger diameter portion 7a placed near driven shaft 2, a medium diameter middle portion 7b extending leftward from large diameter portion 7a through a first cone part (no numeral), and a smaller diameter portion 7c extending leftward from diameter middle portion 7b through a second cone part (no numeral). As will be described in detail hereinafter, medium diameter middle portion 7b covers and holds an outer race 24 of radial ball bearing unit 22, and smaller diameter portion 7c covers and holds an outer cylindrical surface of annular seal member 20.

As is seen from FIG. 1, inside larger diameter portion 7a of cylindrical casing 7 and around first annular dust cover 27, there is concentrically disposed a third annular dust cover 29.

Like the above-mentioned first and second annular dust covers 27 and 28, third annular dust cover 29 is made of a ferrous metal and has a generally U-shaped cross section, and comprises an outer cylindrical portion 29a that is press-fitted on an inner surface of larger diameter portion 7a of cylindrical casing 7, an annular flange portion (no numeral) that abuts on both the first cone part of cylindrical casing 7 and a right end of outer race 24 of radial ball bearing unit 22, and an inner cylindrical portion 29b that is in contact with an outer surface of annular seal member 21.

That is, as is best seen from FIG. 3, third dust cover 29 is arranged to face and engage the above-mentioned first dust cover 27 to define therebetween a complicated path "C1". That is, an annular groove defined by the portions 29a and 29b of third dust cover 29 surrounds outer cylindrical portion 27c of first dust cover 27, and the annular groove defined by the portions 27a, 27b and 27c of first dust cover 27 surrounds inner cylindrical portion 29b of third dust cover 29.

Accordingly, due to provision of outer cylindrical portion 27c of first dust cover 27, radial ball bearing unit 22 is protected from being directly attached by muddy water splashed forward by an associated motor vehicle.

Furthermore, due to its complicated shape, the path "C1" constitutes a so-called labyrinth structure and thus, the muddy water blocking function is much promoted.

Radial ball bearing 22 comprises an annular inner race 23 that is tightly mounted on medium diameter middle portion 11 of stub shaft 9, the above-mentioned annular outer race 24 that is tightly held in medium diameter middle portion 7b of cylindrical casing 7 and a plurality of steel balls 25 rotatably held between inner and outer races 23 and 24. For smoothing rotation of balls 25, each race 23 or 24 has, at a portion contacting balls 25, an annular groove of a circular arc cross section.

As shown in FIG. 3, between driven side yoke 13 and radial ball bearing unit 22, there is tightly put an annular plate 30 of engineering plastic. More specifically, annular plate 30 is tightly put between a right end surface 14e of smaller diameter right end portion 14a of driven side yoke 13 and a left end surface 23d of inner race 23 of radial ball bearing unit 22, so that driven side yoke 13 and inner race 23 rotate like a single unit.

Due to provision of annular plate 30, a frictional resistance, that is inevitably produced between right end surface 14e and left end surface 23d by a certain delay with which rotation of inner race 23 starts upon rotation of driven side yoke 13, is reduced, and for the same reason, undesired vibration and noise are suppressed or at least minimized.

As shown, a certain space defined between a right end surface of radial ball bearing unit 22 and a left end surface of annular seal member 21 holds a certain amount of grease "G", and like this, a certain space defined between a left end surface of radial ball bearing unit 22 and a right end surface of annular seal member 20 holds grease "G".

Furthermore, as is best shown in FIG. 3, between annular seal member 21 and cylindrical portion 11b of stub shaft 9, there is placed a rust-proofing cylindrical member 34, and like this, between annular seal member 20 and smaller diameter right end portion 14a of driven side yoke 13, there is placed another rust-proofing cylindrical member 33.

As will be apparent hereinafter, two rust-proofing members 34 and 33 are members that rotate together with stub shaft 9 (and thus with driven side yoke 13).

Figure 4A:
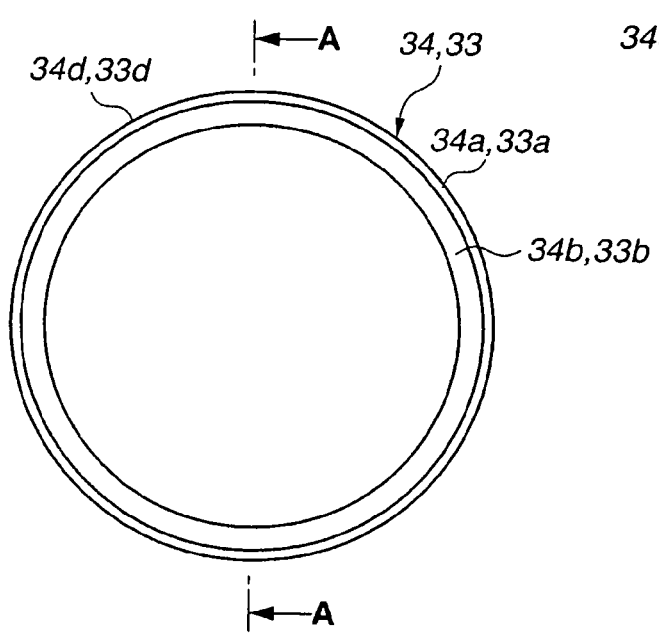
FIG. 4A is a plan view of a rust-proofing cylindrical member employed in the support device of the first embodiment.
Figure 4B:
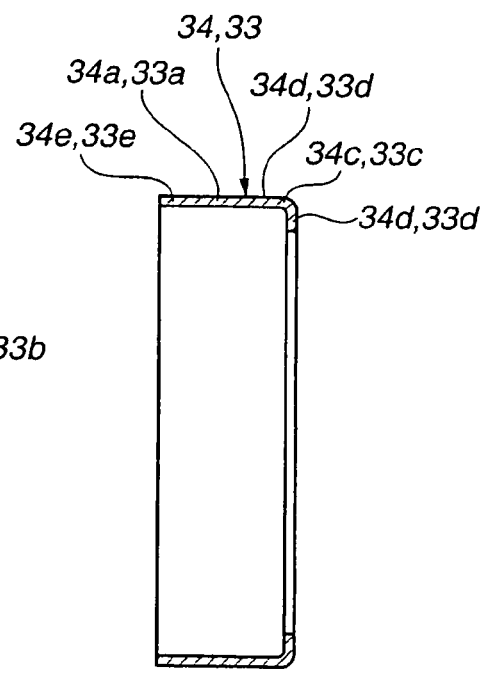
FIG. 4B is a sectional view taken along the line of Fig. A-A of FIG. 4A.

As is seen from FIGS. 4A and 4B, each rust-proofing cylindrical member 34 or 33 is made of a rust-resistant material, such as stainless steel, engineering plastic or the like. A metal plated metal may be also used.

Rust-proofing cylindrical member 34 comprises a cylindrical portion 34a that is press-fitted on cylindrical portion 11b and an annular flange portion 34b that extends radially inward from a left end 34c of cylindrical portion 34a and is tightly put between a left end surface 11d of cylindrical portion 11b and a right end surface 23c of inner race 23 of radial ball bearing unit 22, and like this, the other rust-proofing cylindrical member 33 comprises a cylindrical portion 33a that is press-fitted on smaller right end portion 14a of driven side yoke 13 and an annular flange portion 33b that extends radially inward from a right end of cylindrical portion 33a and is tightly put between the right end surface 14e of the right end portion 14a and a left end surface of the above-mentioned annular plate 30.

Rust-proofing cylindrical members 34 is mounted on stub shaft 9 and thus rotates together with the same, and the other rust-proofing cylindrical member 33 is mounted on driven side yoke 13 and thus rotates together with the same.

Accordingly, when driven side yoke 13 and stub shaft 9 rotate like a single unit, an outer surface 34d of cylindrical portion 34a of rust-proofing cylindrical member 34 slidably contacts inner surface 21a of annular seal member 21 and at the same time, an outer surface 33d of cylindrical portion 33a of the other rust-proofing cylindrical member 33 slidably contacts inner surface 20a of the other annular seal member 20.

As is mentioned hereinabove, annular flange portion 34b is tightly received between the left end surface 11d of cylindrical portion 11b and the right end surface of inner race 23, and like this, annular flange portion 33b is tightly received between the right end surface 14e of the right end portion 14a and the left end surface of the annular plate 30.

Accordingly, even when, under united rotation of driven side yoke 13 and stub shaft 9, these elements are applied with a remarkable load in axial direction, undesired axial displacement therebetween is suppressed, so that the sliding contact of outer surface 34d or 33d of the cylindrical portion 34a or 33a with inner surface 21a or 20a of annular seal member 21 or 20 is maintained.

Accordingly, undesired abrasion of inner surface 21a or 20a of annular seal member 21 or 20, which would be inevitably caused by an axial displacement between the two rust-proofing cylindrical members 34 and 33, is suppressed or at least minimized.

Furthermore, even if muddy water happens to enter the labyrinth structures "C1" and "C" under cruising of an associated motor vehicle in the rain, the rust-proofing cylindrical members 34 and 33 exhibit a satisfied non corrosive performance.

Accordingly, inner surfaces 21a and 20a of the two annular seal members 21 and 20, against which outer surfaces 34d and 33d of cylindrical portions 34a and 33a of the two rust-proofing cylindrical members 34 and 33 slidably contact under united rotation of stub shaft 9 and driven side yoke 13, are suppressed from an abrasion of a type caused by deterioration with time.

Thus, the sealing performance of the two seal members 21 and 20 is assuredly kept for a long time while protecting radial ball bearing unit 22 from muddy water.

Figure 5:
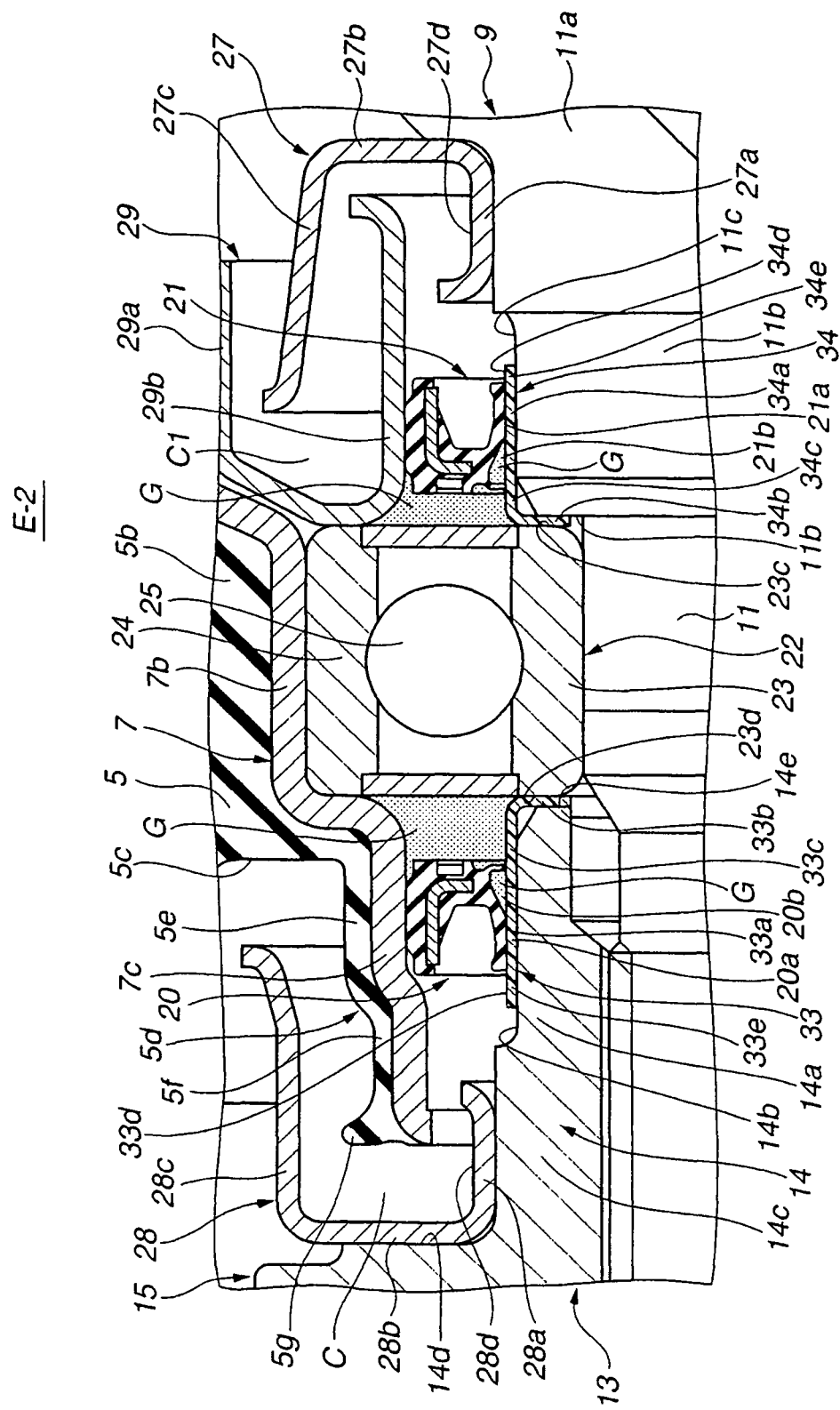
FIG. 5 is a view similar to FIG. 3, but showing a second embodiment of the present invention.

Referring to FIG. 5, there is shown a support device E-2 of a second embodiment of the present invention.

Since this second embodiment E-2 is similar to the above-mentioned first embodiment E-1, only portions or elements that are different from those of the first embodiment E-1 will be described in detail in the following.

As is seen from FIG. 5, in the second embodiment E-2, two rust-proofing cylindrical members 34 and 33 are made of a low friction material, such as polyacetal resin or the like.

Furthermore, in this second embodiment E-2, there is no member that corresponds to annular plate 30 used in the first embodiment E-1, and thus, annular flange portion 33b of rust-proofing cylindrical member 33 is in contact with the left end surface of inner race 23 of radial ball bearing unit 22, as shown.

That is, in the second embodiment E-2, the two rust-proofing cylindrical members 34 and 33 have a surface friction coefficient lower than that of end surfaces 23c and 23d of inner race 23 of radial ball bearing unit 22.

Thus, even if, under united rotation of rust-proofing cylindrical member 33 and driven side yoke 13, end surface 23d of inner race 23 is subjected to a circumferential stress relative to annular flange portion 33b of the member 33, a friction resistance produced therebetween is quite small.

That is, annular flange portion 33b serves as the above-mentioned annular plate 30 employed in the first embodiment E-1. Thus, the number of parts for producing the propeller shaft is reduced, which means reduction in cost of the propeller shaft.

Furthermore, even when the two rust-proofing cylindrical members 34 and 33 have a surface friction coefficient lower than that of end surfaces 23c and 23d of inner race 23 of radial ball bearing unit 22, the tight placement of annular flange portion 34b or 33b between stub shaft 9 or driven side yoke 13 and right or left end surface of inner race 23 prevents undesirable axial displacement of the two rust-proofing cylindrical members 34 and 33.

Accordingly, the sliding contract between outer surface 34d or 33d of cylindrical portion 34a or 33a and inner surface 21a or 20a of annular seal member 21 or 20 is assuredly kept for a long time.

As a result, abrasion of inner surface 21a or 20a of annular seal member 21 or 20, that would be induced by the axial displacement of the rust-proofing cylindrical portions 34 and 33, is suppressed or at least minimized, which brings about a longer life of annular seal member 21 or 20.

Furthermore, even if muddy water happens to enter the interior of the labyrinth structures "C" and "C1" thereby getting outer surfaces 34d and 33d of rust-proofing cylindrical members 34 and 33 wet by the water, the members 34 and 33 are suppressed from gathering rust.

That is, like in the above-mentioned first embodiment E-1, also in the second embodiment E-2, inner surfaces 21a and 20a of the two annular seal members 21 and 20 are suppressed from an abrasion of a type caused by deterioration with time, and thus the sealing performance of the seal members 21 and 20 is assuredly kept for a long time while protecting radial ball bearing unit 22 from muddy water.

If desired, one surface of annular flange portion 34b of rust-proofing cylindrical member 34 that contacts right end surface 23c of inner race 23 of radial ball bearing unit 22 may be polished. Like this, one surface of annular flange portion 33b of the other rust-proofing cylindrical member 33 that contacts left end surface 23d of inner race of radial ball bearing unit 22 may be polished. With such polished surfaces, a frictional resistance between inner race 23 and each cylindrical member 34 or 33 is reduced.

Figure 6:
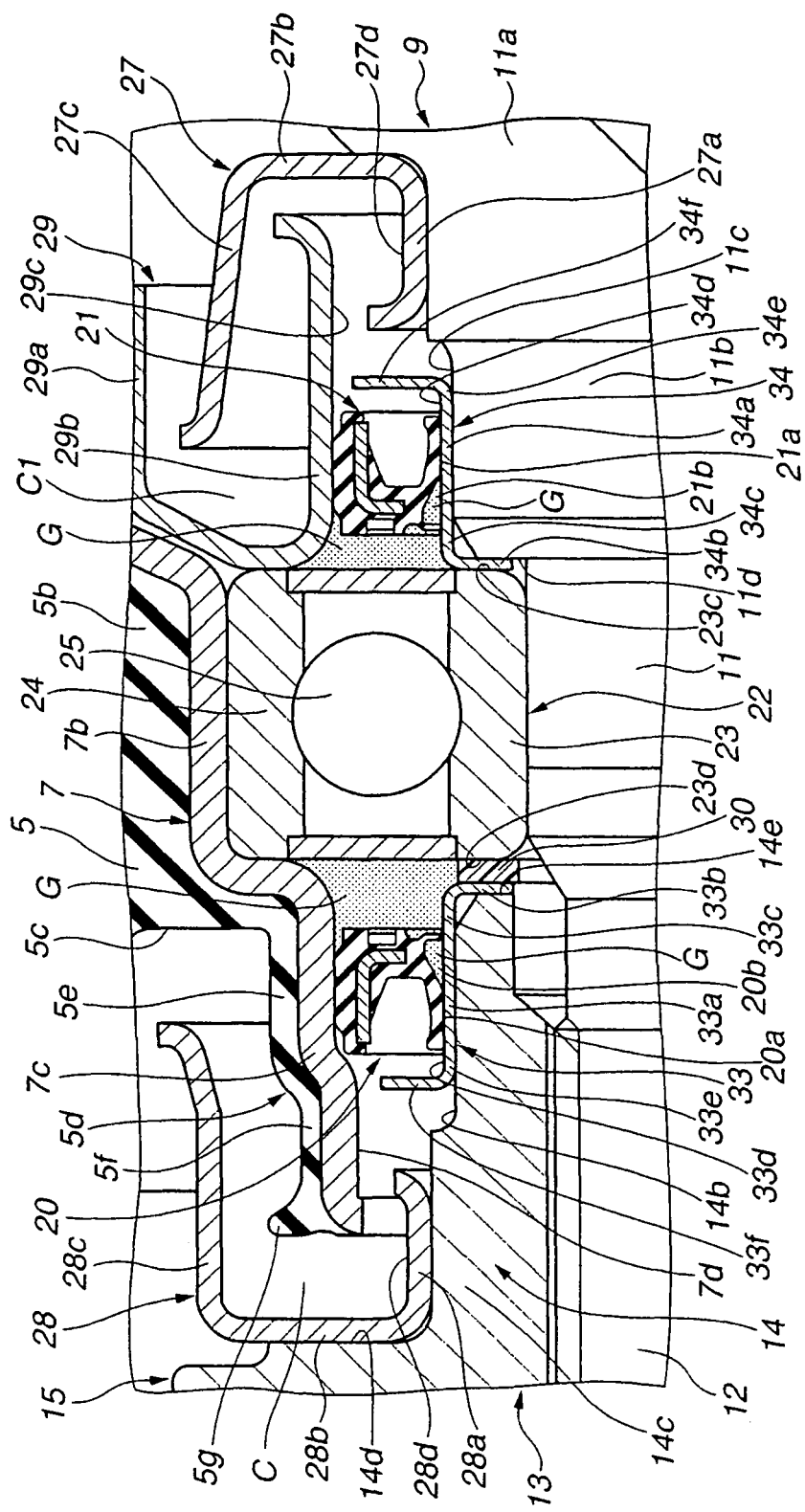
FIG. 6 is a view similar to FIG. 3, but showing a third embodiment of the present invention.

Referring to FIG. 6, there is shown a support device E-3 of a third embodiment of the present invention.

Since this third embodiment E-3 is similar to the above-mentioned first embodiment E-1, only portions that are different from those of the first embodiment E-1 will be described in detail in the following.

As is seen from FIG. 6, in the third embodiment E-3, each of two rust-proofing cylindrical members 34 and 33 has at an axially outer end 34e or 33e an outer annular flange portion 34f or 33f that extends radially outward.

Furthermore, outer annular flange portion 34f is placed between a right end of annular seal member 21 and a raised left end of inner cylindrical portion 27a of first annular dust cover 27 in such a manner as to almost shut a terminal part of the complicated path "C1" of the labyrinth structure, and similar to this, the other outer annular flange portion 33f is placed between a left end of annular seal member 20 and a raised right end of inner cylindrical portion 28a of second annular dust cover 28 in such a manner as to almost shut a terminal part of the complicated path "C" of the labyrinth structure.

Due to provision of outer annular flange portions 34f and 33f, the paths "C1" and "C" of labyrinth structure are more complicated, and thus, the muddy water blocking function is much promoted.

Figure 7:
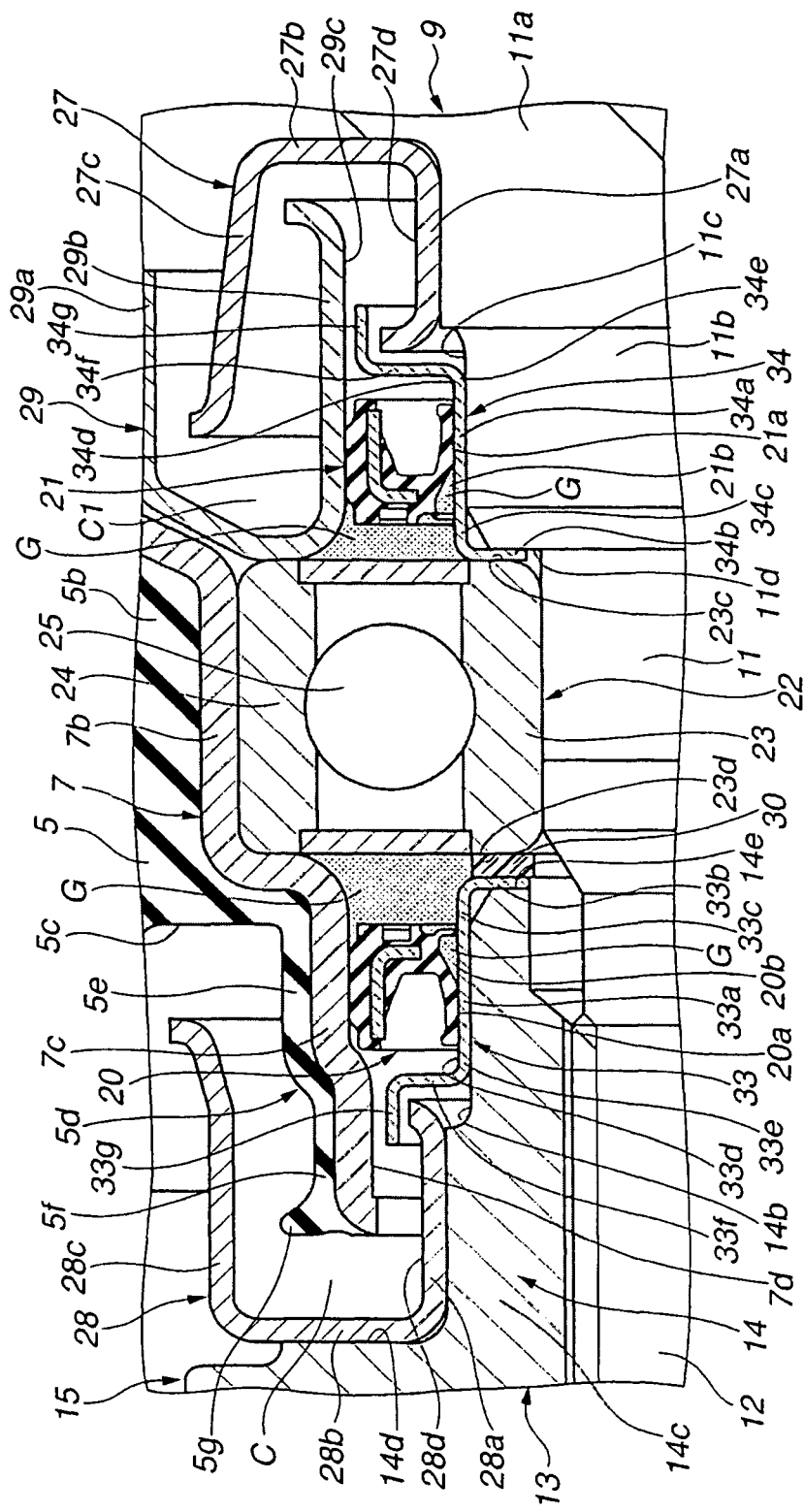
FIG. 7 is a view similar to FIG. 3, but showing a fourth embodiment of the present invention.

Referring to FIG. 7, there is shown a support device E-4 of a fourth embodiment of the present invention.

Since this fourth embodiment E-4 is similar to the above-mentioned third embodiment E-3, only portions that are different from those of the third embodiment E-3 will be described in detail in the following.

As is seen from FIG. 7, in this fourth embodiment E-4, outer annular flange portion 34f or 33f has a cylindrical part 34g or 33g that extends axially outward therefrom.

As shown, cylindrical part 34g is placed between the raised left end of inner cylindrical portion 27a of first annular dust cover 27 and inner cylindrical portion 29b of third annular dust cover 29, and cylindrical part 33f is placed between the raised right end of inner cylindrical portion 28a of second annular dust cover 28 and smaller diameter portion 7c of cylindrical casing 7.

Due to provision of such cylindrical parts 34g and 33g, the paths "C1" and "C" of labyrinth structure are much complicated and thus the muddy water block function is much improved.

Figure 8:
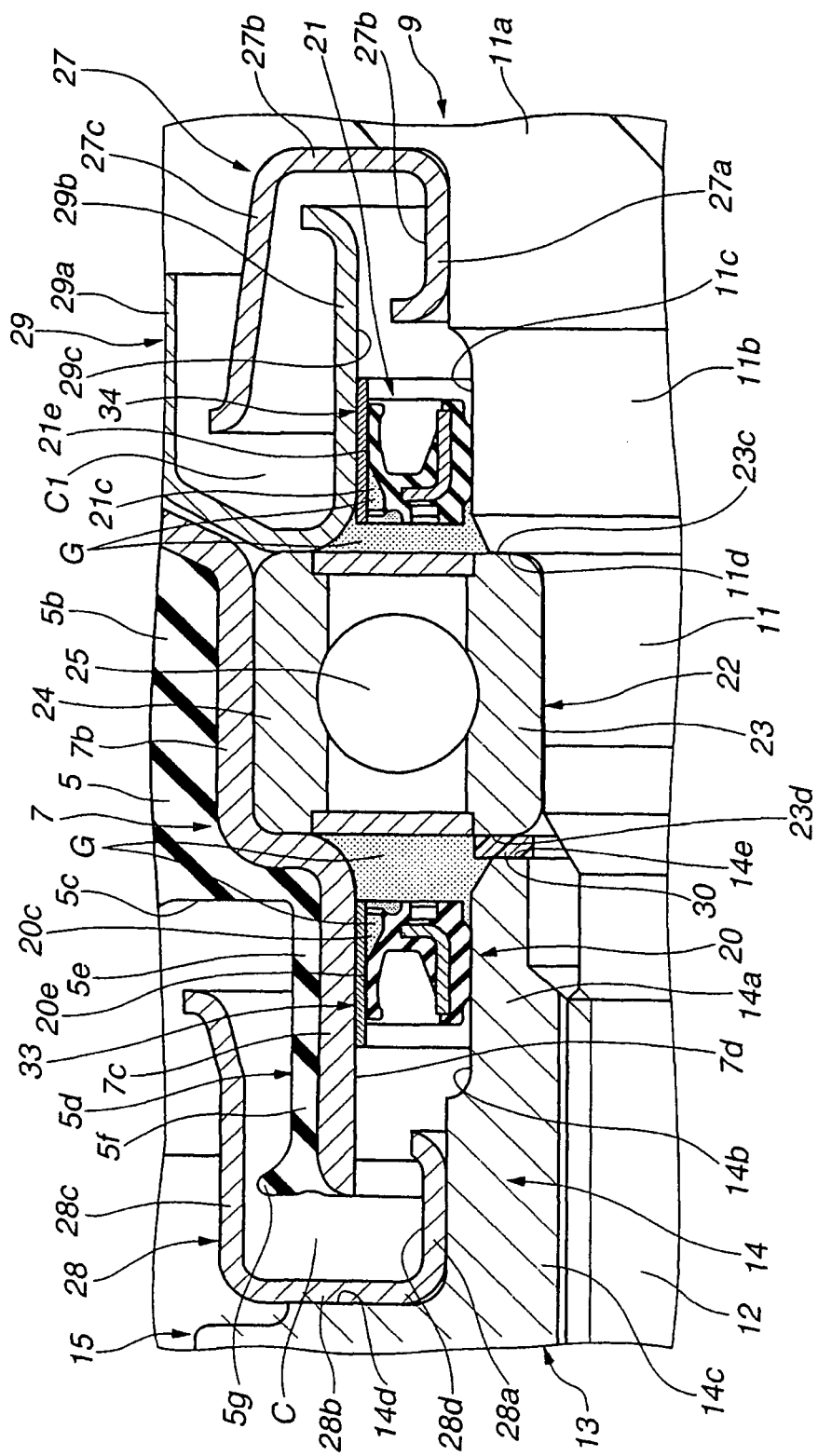
FIG. 8 is a view similar to FIG. 3, but showing a fifth embodiment of the present invention.

Referring to FIG. 8, there is shown a support device E-5 of a fifth embodiment of the present invention.

As is seen from this drawing, in this fifth embodiment E-5, rust-proofing cylindrical member 34 is tightly disposed on an inner surface 29c of inner cylindrical portion 29b of third annular dust cover 29, and an inner cylindrical surface of the member 34 slidably contacts an outer surface of annular seal member 21. Like this, the other rust-proofing cylindrical member 33 is tightly disposed on an inner surface smaller diameter portion 7c of cylindrical casing 7 and an inner cylindrical surface of the member 33 slidably contacts an outer surface of the other annular seal member 20. Annular seal member 21 is tightly disposed on cylindrical portion 11b of stub shaft 9, and the other annular seal member 20 is tightly disposed on cylindrical right end portion 14a of driven side yoke 13.

Thus, in this fifth embodiment E-5, rust-proofing cylindrical members 34 and 33 are stationary members that are held by annular bracket 6 (see FIG. 1) through annular elastic member 5, and two annular seal members 21 and 22 are members that rotate together with stub shaft 9 (and thus with driven side yoke 13).

As is seen from the drawing, rust-proofing cylindrical members 34 and 33 employed in this fifth embodiment E-5 are of a simple type having no axial ends bent radially outward or to inward.

Furthermore, as is seen from the drawing, each annular seal member 21 or 20 is formed with an annular lip portion 21c or 20c that contacts an inner surface of rust-proofing cylindrical member 34 or 33.

Accordingly, when driven side yoke 13 and stub shaft 9 rotate like a single unit, undesired abrasion of the outer surfaces 21e and 20e of annular seal members 21 and 20, which would be inevitably caused by an axial displacement between the two rust-proofing cylindrical members 34 and 33, is suppressed or at least minimized.

Furthermore, even if muddy water happens to enter the labyrinth structures "C1" and "C", the rust-proofing cylindrical members 34 and 33 exhibit a satisfied non corrosive performance and thus prevent rust of radial ball bearing unit 22.

Figure 9:
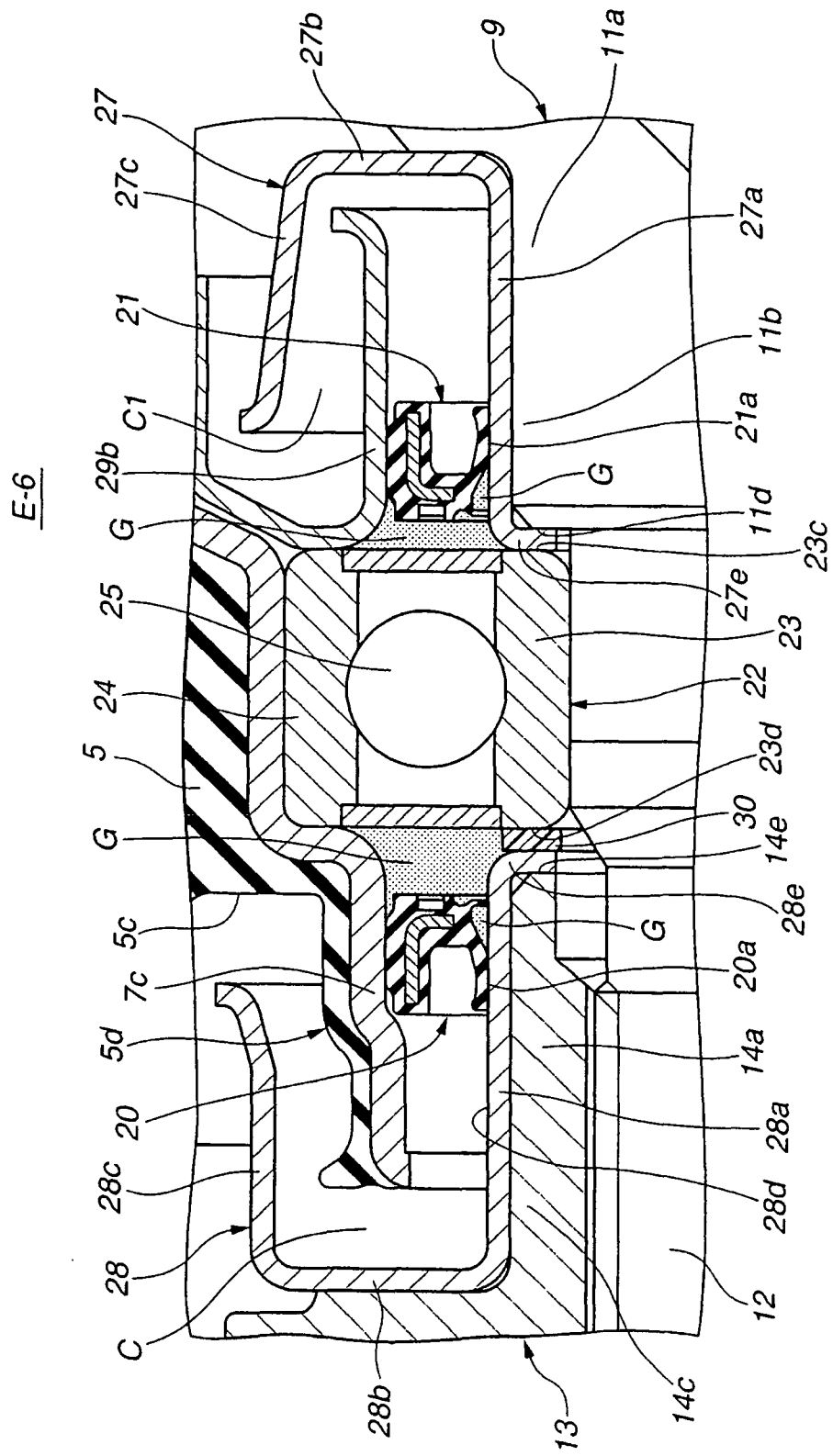
FIG. 9 is a view similar to FIG. 3, but showing a sixth embodiment of the present invention.

Referring to FIG. 9, there is shown a support device E-6 of a sixth embodiment of the present invention.

As is seen from this drawing, in this sixth embodiment E-6, there are no members that correspond to the above-mentioned independent rust-proofing cylindrical members 34 and 33.

However, in this sixth embodiment E-6, first and second annular dust covers 27 and 28 function to serve as the rust-proofing cylindrical members 34 and 33.

That is, first and second annular dust covers 27 and 28 are each made of a rust-proofing material, such as a stainless steel or the like. Furthermore, as is seen from the drawing, a left end 27e of inner cylindrical portion 27a of first annular dust cover 27 is bent radially inward and tightly put between the right end of inner race 23 of radial ball bearing unit 22 and left end surface 11d of cylindrical portion 11b of stub shaft 9, and a right end 28e of inner cylindrical portion 28a of second annular dust cover 28 is bent radially inward and tightly put between right end surface 14e of driven side yoke 13 and annular plate 30 that is put on left end surface 23d of inner race 23 of radial ball bearing unit 22.

If desired, one surface of bent left end 27e of inner cylindrical portion 27a of first annular dust cover 27 that contacts the right end surface of inner race 23 of radial ball bearing unit 22 may be polished, and like this, one surface of bent right end 28e of inner cylindrical portion 28a of second annular dust cover 28 may be polished. With such polishing, friction coefficient of the surfaces can be reduced.

In this sixth embodiment E-6, annular seal member 21 is tightly disposed on an inner surface of inner cylindrical portion 29b of third annular dust cover 29, and inner surface 21a of annular seal member 21 slidably contacts an outer surface of inner cylindrical portion 27a of first annular dust cover 27 that is made of the rust-proofing material. Furthermore, the other annular seal member 20 is tightly disposed on an inner surface of cylindrical portion 7c of cylindrical casing 7, and inner surface 20a of the seal member 20 slidably contacts an outer surface of inner cylindrical portion 28a of second annular dust cover 28.

That is, in this sixth embodiment E-6, the two annular seal members 21 and 20 are stationary members that are held by annular bracket 6 (see FIG. 1) through annular elastic member 5.

Due to provision of the radially outward bent ends 27e and 28e of first and second annular dust covers 27 and 28, undesired axial displacement between these two dust covers 27 and 28 is suppressed or at least minimized. Thus, the sealing contact between annular seal member 21 and inner cylindrical portion 27a of first annular dust cover 27 and that between the other annular seal member 20 and inner cylindrical portion 28a of second annular dust cover 28 are assuredly kept for a long time.

Thus, undesired abrasion of both inner surface 21a of annular seal member 21 and inner surface 20a of the other annular seal member 20, which would be inevitably caused by an axial displacement between first and second annular dust covers 27 and 28, is suppressed or at least minimized.

Thus, even if muddy water happens to enter the labyrinth structures "C1" and "C", the rust-proofing first and second annular dust covers 27 and 28 exhibit a satisfied non corrosive performance and thus prevent rust of radial ball bearings 22.

Figure 10:
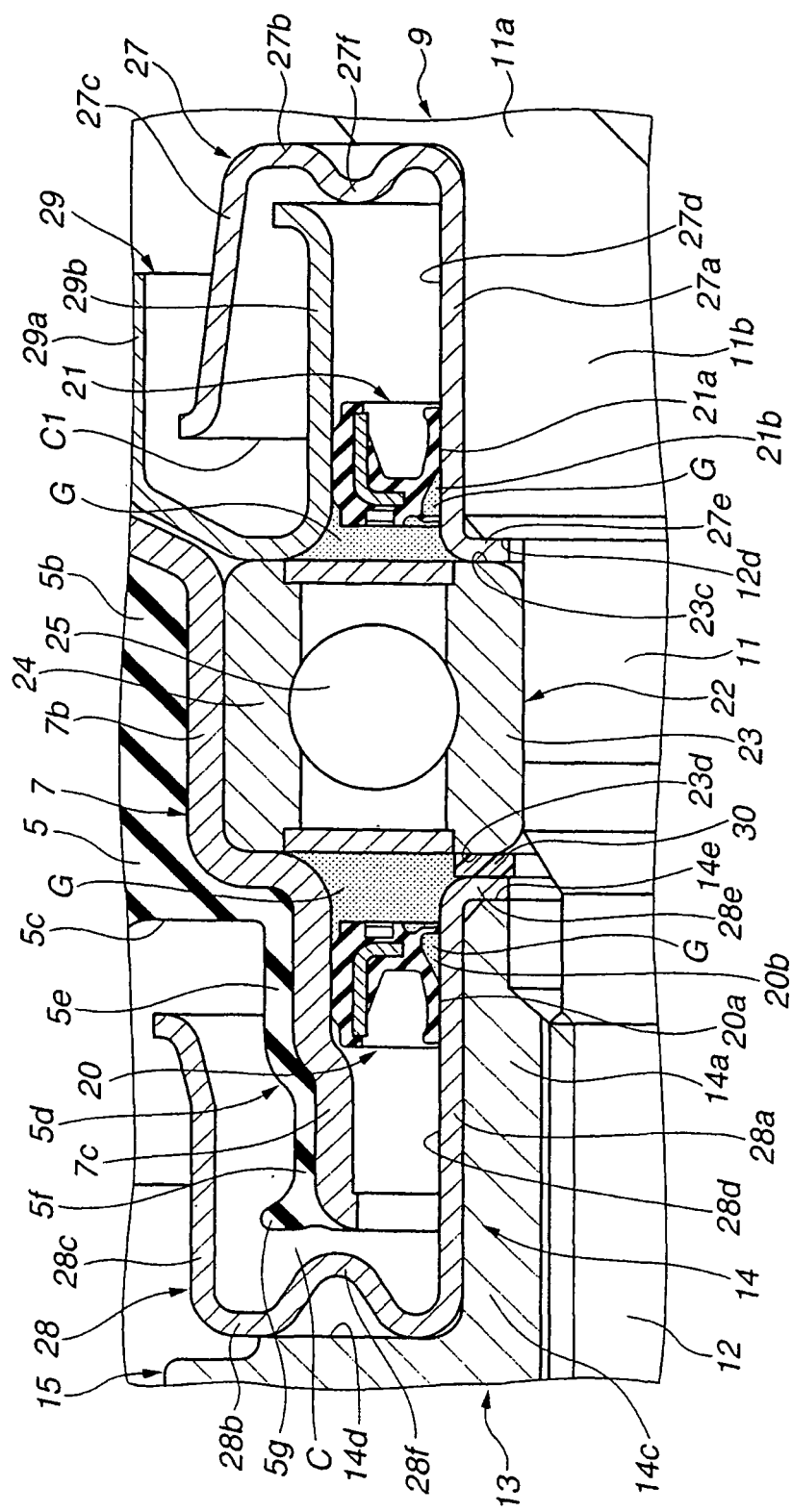
FIG. 10 is a view similar to FIG. 3, but showing a seventh embodiment of the present invention.

Referring to FIG. 10, there is shown a support device E-7 of a seventh embodiment of the present invention.

Since this seventh embodiment E-7 is similar to the above-mentioned sixth embodiment E-6 of FIG. 9, only portions that are different from those of the sixth embodiment E-6 will be described in the following.

That is, as is seen from the drawing, in this seventh embodiment E-7, annular flange portion 27b of first annular dust cover 27 is formed with an annular projection 27f that projects leftward, that is, toward annular seal member 21. Furthermore, annular flange portion 28b of second annular dust cover 28 is formed with an annular projection 28f that projects rightward, that is, toward annular seal member 20.

Due to provision of such annular projections 27f and 28f, the two labyrinth structures "C1" and "C" are more complicated in construction and thus the muddy water blocking function is much promoted in this seventh embodiment E-7.

Figure 11:
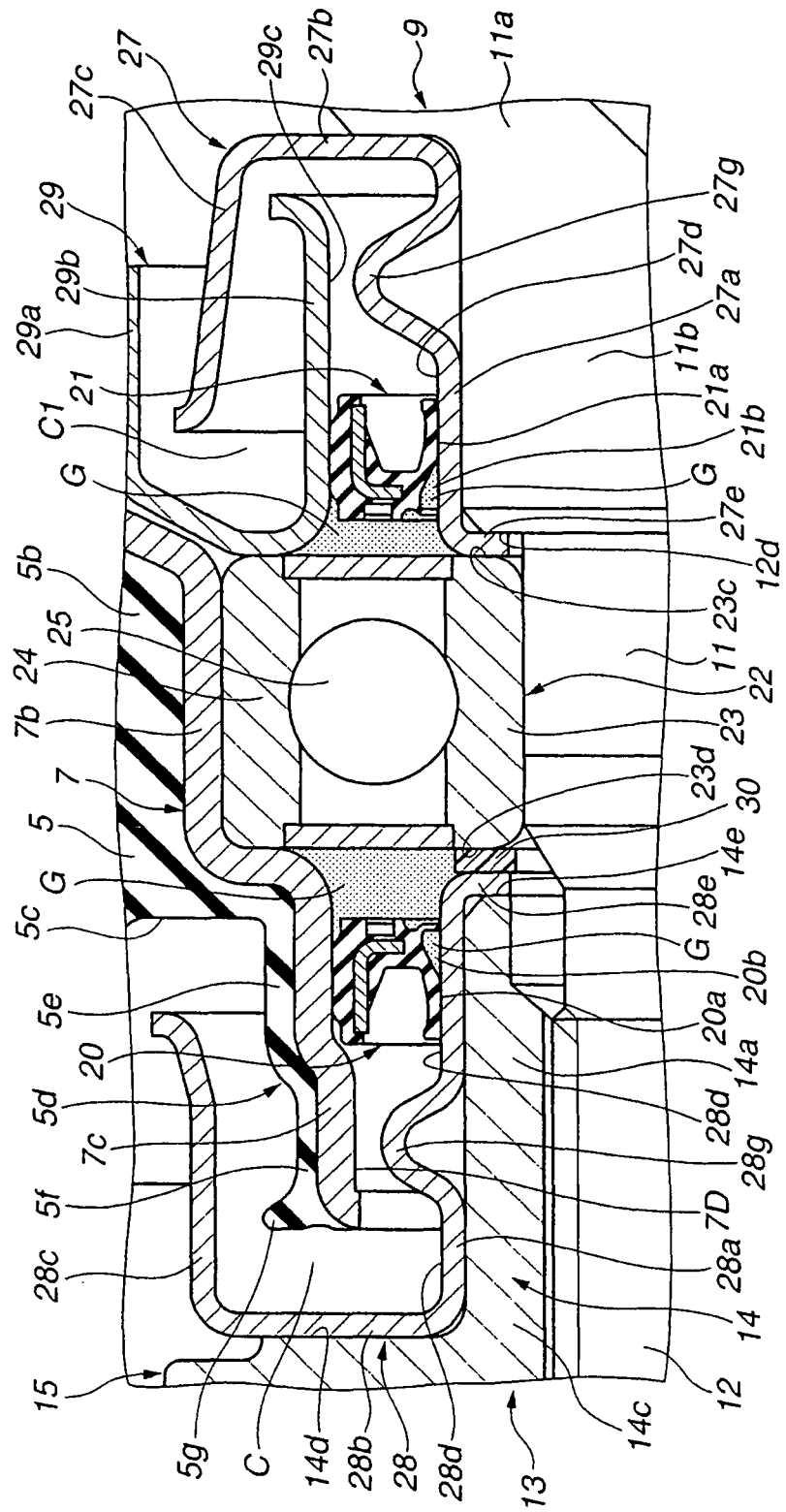
FIG. 11 is a view similar to FIG. 3, but showing an eighth embodiment of the present invention.

Referring to FIG. 11, there is shown a support device E-8 of an eighth embodiment of the present invention.

Since this eighth embodiment E-8 is similar to the above-mentioned sixth embodiment E-6 of FIG. 9, only portions that are different from those of the sixth embodiment E-6 will be described in the following.

That is, as is seen from the drawing, in this eighth embodiment E-8, inner cylindrical portion 27a of first annular dust cover 27 is formed with an annular ridge 27g that projects radially outward, that is, toward inner cylindrical portion 29b of third annular dust cover 29, and inner cylindrical portion 28a of second annular dust cover 28 is also formed with an annular ridge 28g that projects radially outward, that is, toward cylindrical portion 7c of cylindrical casing 7.

Like in the above-mentioned seventh embodiment E-7, due to provision of annular ridges 27g and 28g, the two labyrinth structures "C1" and "C" are more complicated in construction and thus the muddy water blocking function is much promoted in this eighth embodiment E-8.

Figure 12:
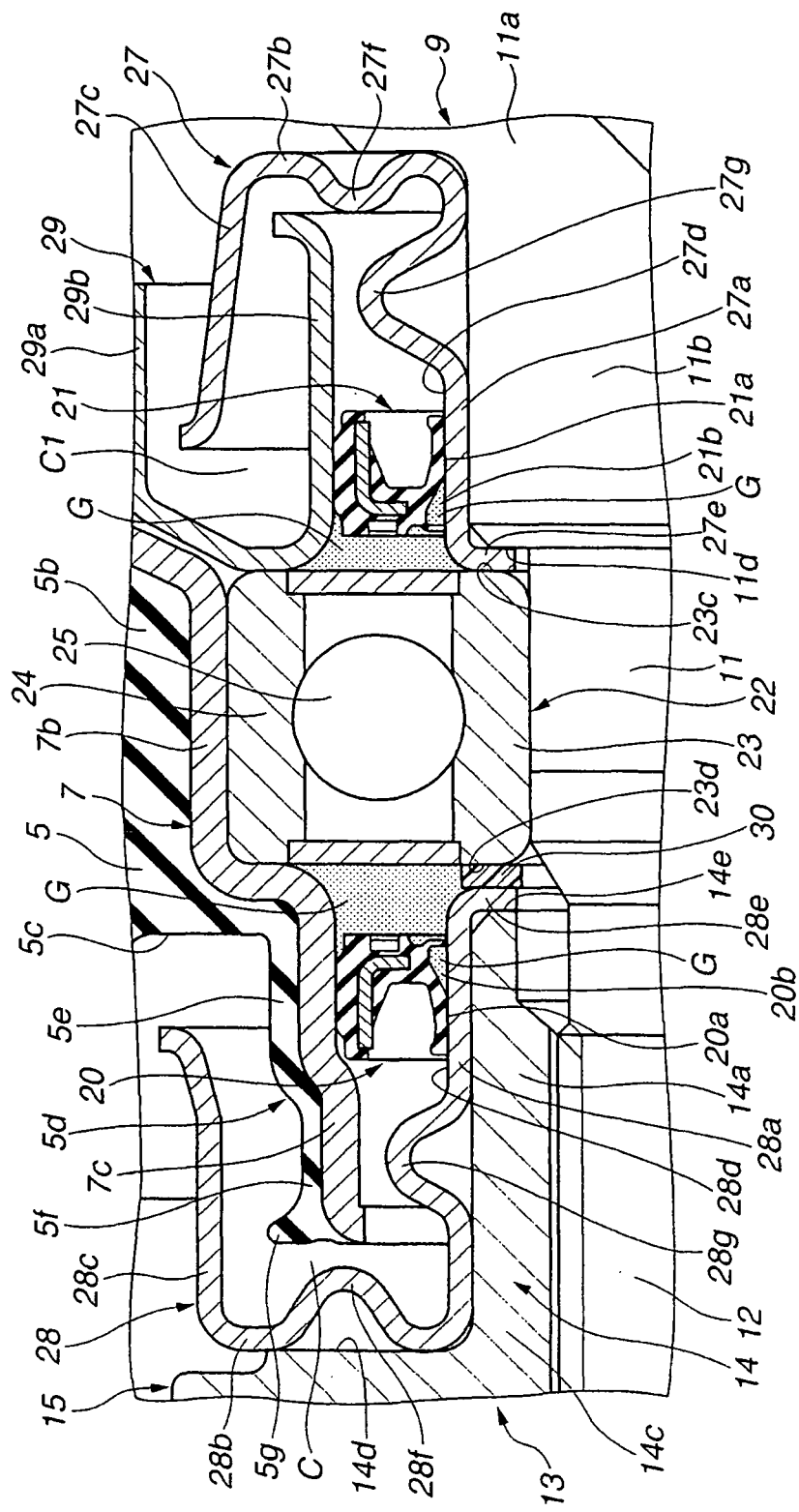
FIG. 12 is a view similar to FIG. 3, but showing a ninth embodiment of the present invention.

Referring to FIG. 12, there is shown a support device E-9 of a ninth embodiment of the present invention.

Since this embodiment E-9 is similar to the above-mentioned eighth embodiment E-8, only portions that are different from those of eighth embodiment E-8 will be described in the following.

As shown in the drawing, support device E-9 of this ninth embodiment E-9 has both the features of the above-mentioned seventh and eighth embodiments E-7 and E-8.

That is, in the ninth embodiment E-9, annular projections 27f and 28f are respectively formed on annular flange portions 27b and 28b of first and second annular dust covers 27 and 28. Furthermore, annular ridges 27g and 28g are respectively formed on inner cylindrical portions 27a and 28a of first and second annular dust covers 27 and 28.

Due to provision of such projections 27f and 28f and annular ridges 27g and 28g, the two labyrinth structures "C1" and "C" are much complicated in construction and thus the muddy water blocking function is much promoted in this ninth embodiment E-9.

Figure 13:
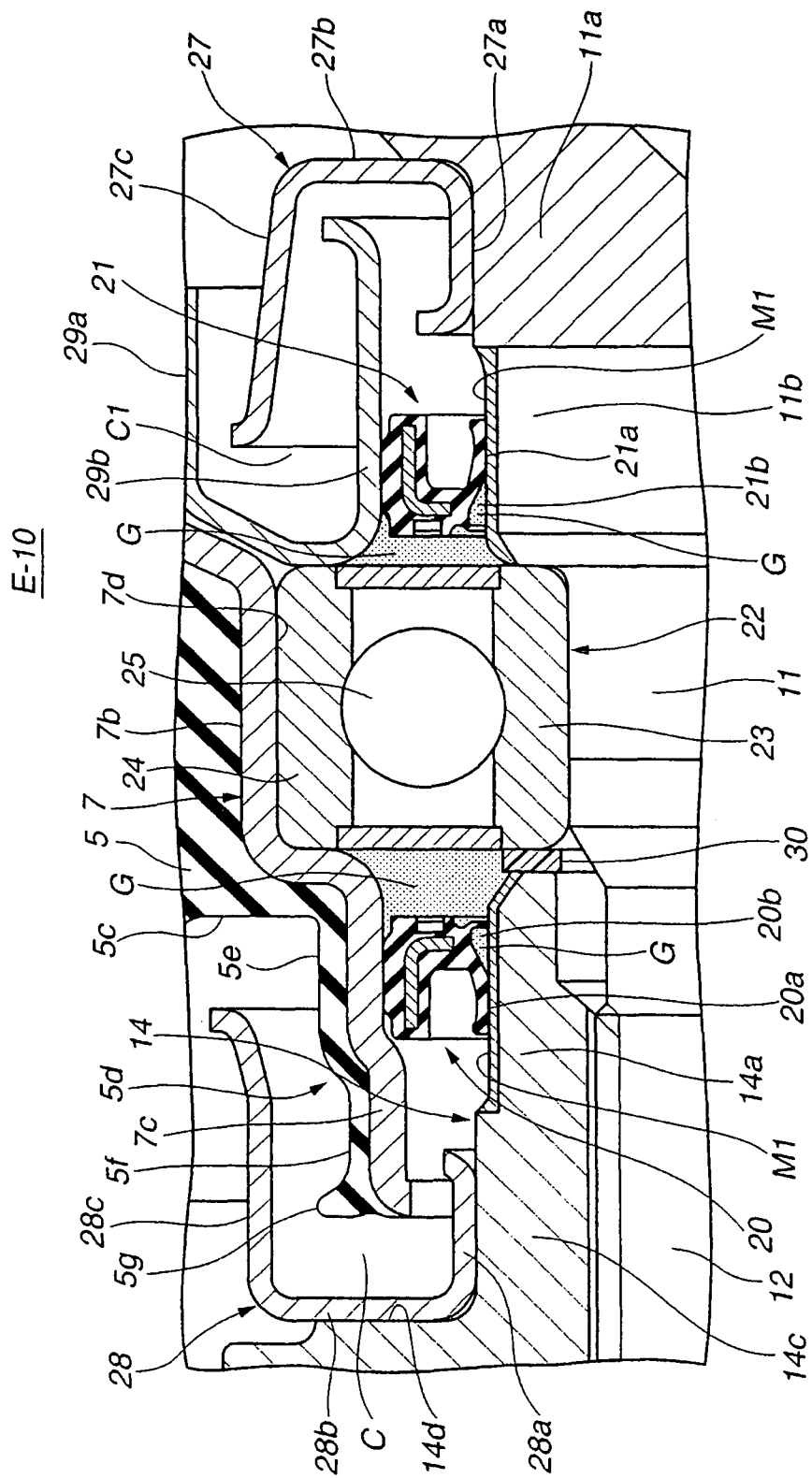
FIG. 13 is a view similar to FIG. 3, but showing a tenth embodiment of the present invention.

Referring to FIG. 13, there is shown a support device E-10 of a tenth embodiment of the present invention.

Since this embodiment E-10 is similar to the above-mentioned first embodiment E-1 of FIG. 3, only portions that are different from those of the first embodiment E-1 will be described in the following.

However, in this tenth embodiment E-10, as a substitute for rust-proofing cylindrical members 34 and 33 employed in the first embodiment E-1, a metal plating is employed.

That is, as is seen from the drawing, a metal plating M1 is applied to an outer surface of cylindrical portion 11b of stub shaft 9, to which the inner surface of annular seal member 21 slidably contacts. Furthermore, the same plating M1 is applied to an outer surface of right end portion 14a of driven side yoke 13, to which the inner surface of the other annular seal member 20 slidably contacts.

Due to presence of the metal-plated surface that exhibits a sufficient rust proofing performance, undesired abrasion of the inner surfaces of the two annular seal members 21 and 20 is suppressed or at least minimized. Accordingly, the muddy water blocking function is much assured.

Figure 14:
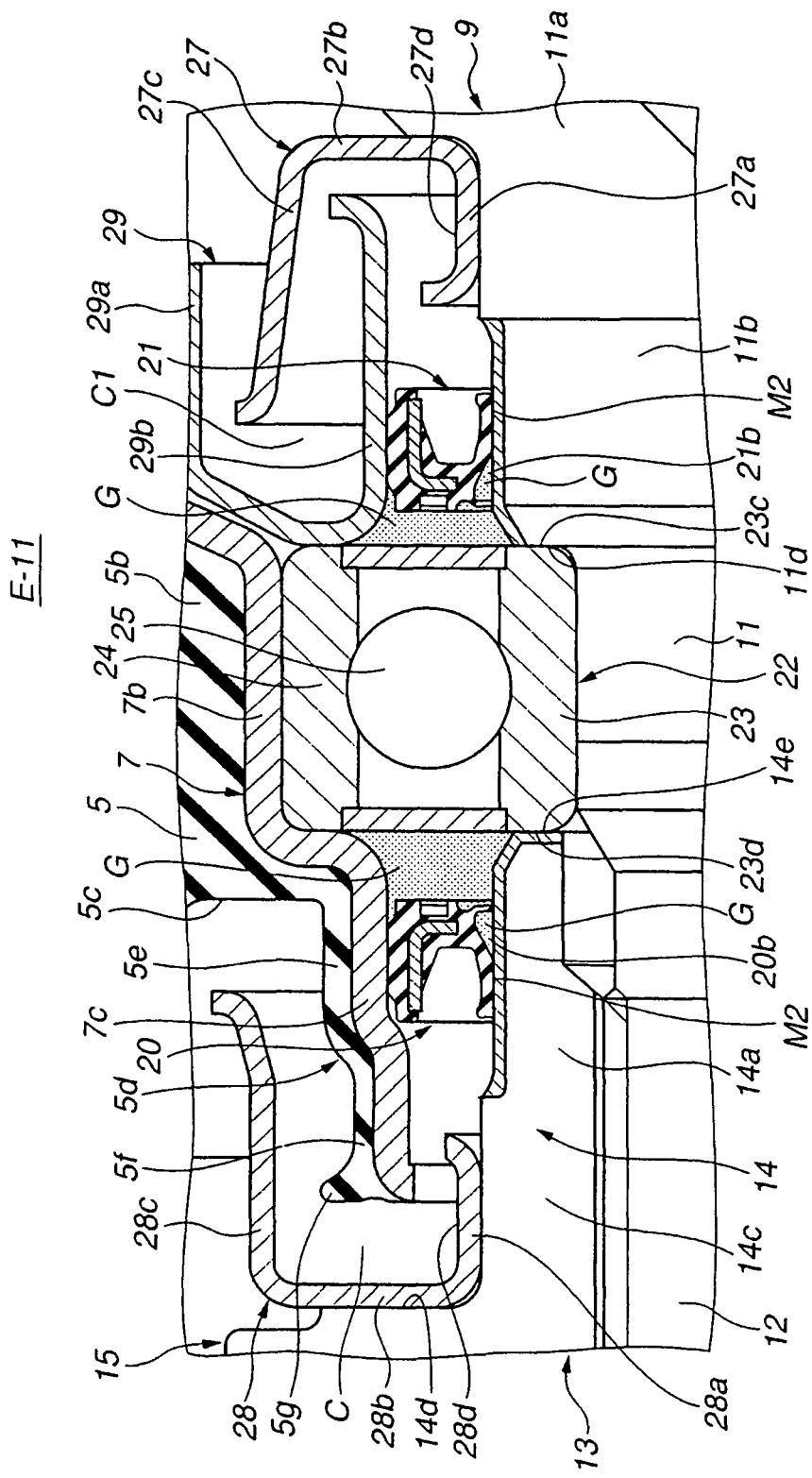
FIG. 14 is a view similar to FIG. 3, but showing an $11^{th}$ embodiment of the present invention.

Referring to FIG. 14, there is shown a support device E-11 of an 11$^{th}$ embodiment of the present invention.

Since this embodiment E-11 is similar to the above-mentioned tenth embodiment E-10, only portions that are different from those of the tenth embodiment E-10 will be described in the following.

That is, in this 11$^{th}$ embodiment E-11, so-called nickel-fluorine resin electroless plating M2 is employed in place of the metal plating M1 of the tenth embodiment E-10.

Furthermore, in this 11$^{th}$ embodiment, a right end part of the plating M2 applied to right end portion 14a of driven side yoke 13 directly abuts against the left end surface of inner race 23 of radial ball bearing unit 22. That is, this embodiment E-11 has no member that corresponds to annular plate 30 used in the tenth embodiment E-10.

Nickel-fluorine resin electroless plating M2 exhibits a low friction performance as well as a rust proofing performance.

Due to the direct contact between the low friction right end part of the plating M2 and the left end surface of the inner race 23, a peripheral displacement between stub shaft 9 and driven side yoke 13, which is inevitably induced when the propeller shaft (biz., a unit including drive side yoke 13 and stub shaft 9) is rotated, is smoothly carried out without producing undesirable noise and abrasion.

Furthermore, due to employment of the rust proofing plating M2 to which annular seal members 21 and 20 contact, the sealing performance of the members 21 and 20 is assuredly kept for a long time while protecting radial ball bearing unit 22 from muddy water.

Figure 15:
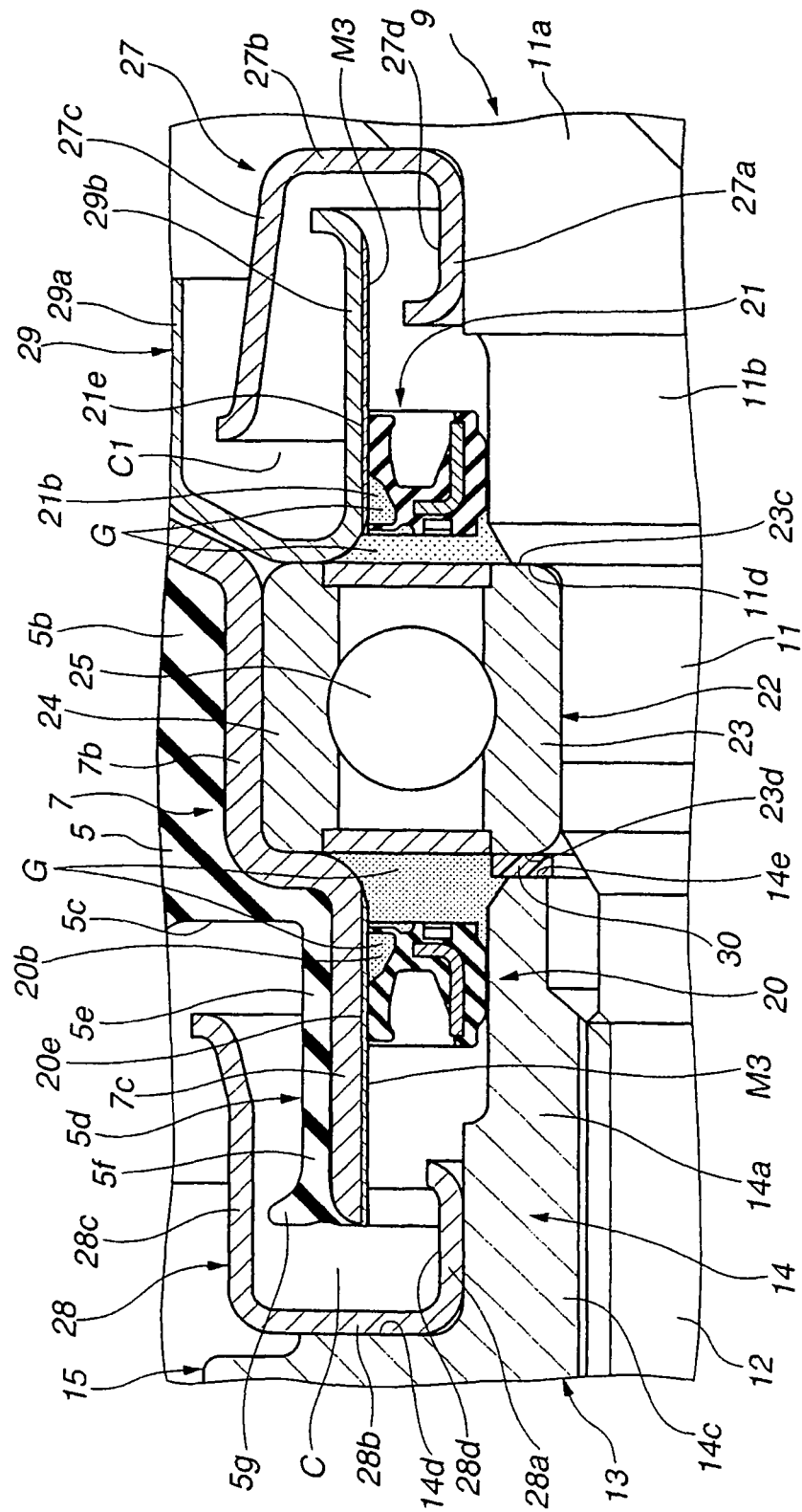
FIG. 15 is a view similar to FIG. 3, but showing a $12^{th}$ embodiment of the present invention.

Referring to FIG. 15, there is shown a support device E-12 of a 12$^{th}$ embodiment of the present invention.

In this embodiment E-12, annular seal member 21 is tightly disposed on cylindrical portion 11b of stub shaft 9, and the other annular seal member 20 is tightly disposed on the cylindrical right end portion 14a of driven side yoke 13.

Furthermore, in this embodiment E-12, a metal plating M3 is applied to an inner surface of inner cylindrical portion 29b of third annular dust cover 29, to which the outer cylindrical portion of annular seal member 21 slidably contacts, and the same metal plating M3 is applied to an inner surface of cylindrical portion 7c of cylindrical casing 7, to which the outer cylindrical portion of the other annular seal member 20 slidably contacts.

Due to provision of metal plating M3 on the inner surfaces of inner cylindrical portion 29b and cylindrical portion 7c, both the annular seal members 21 and 20 can exhibit a satisfied seal performance for a long time, and thus the muddy water blocking to function is much promoted.

Figure 16:
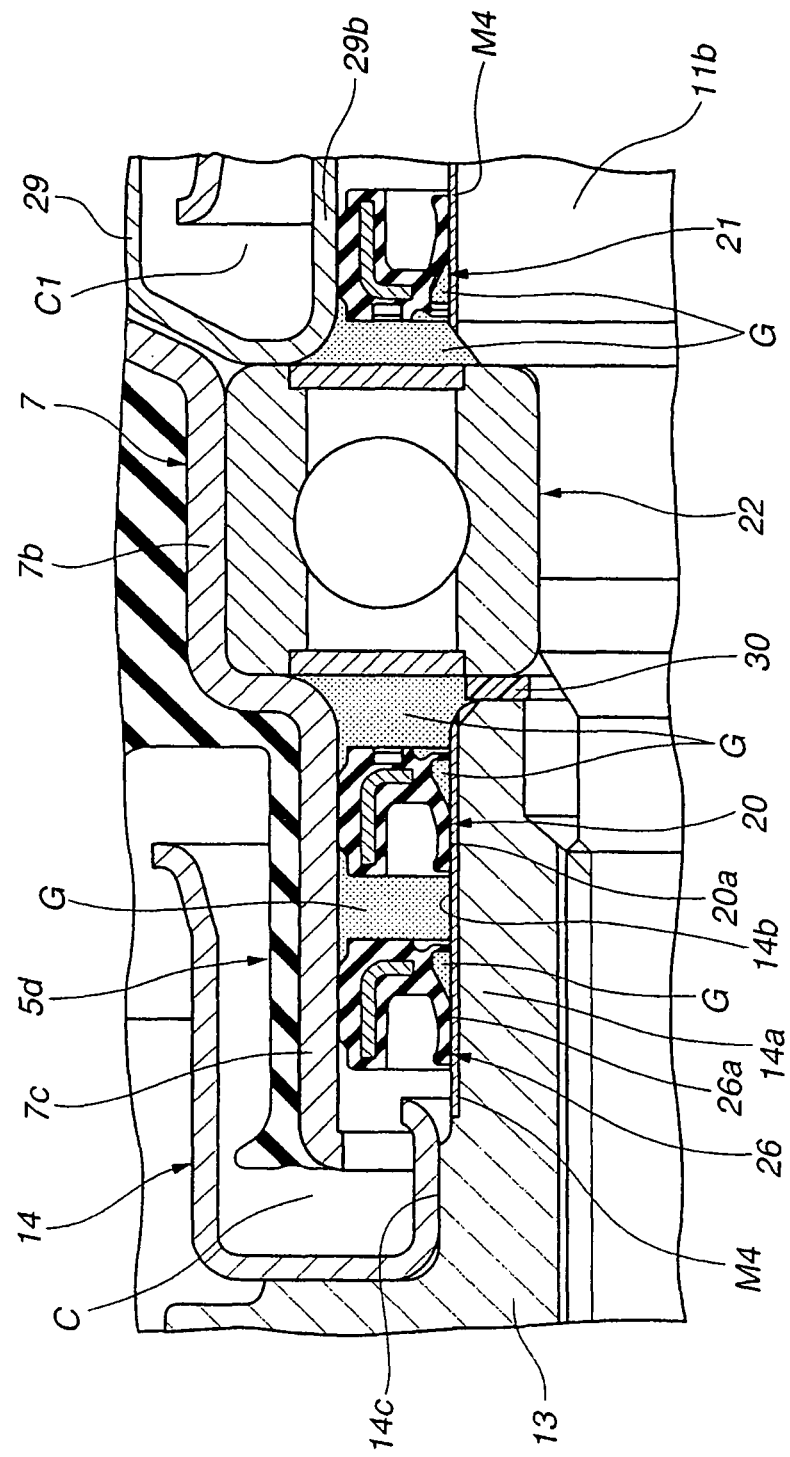
FIG. 16 is a view similar to FIG. 3, but showing a $13^{th}$ embodiment of the present invention.

Referring to FIG. 16, there is shown a support device E-13 of a 13$^{th}$ embodiment of the present invention.

In this embodiment E-13, annular seal member 21 is tightly disposed on the inner surface of inner cylindrical portion 29b of third annular dust cover 29, and the inner surface of annular seal member 21 slidably contacts the outer surface of cylindrical portion 11b of stub shaft 9. The outer surface of cylindrical portion 11b is applied with a metal plating M4.

The other annular seal member 20 is tightly disposed on the inner surface of cylindrical portion 7c of cylindrical casing 7, and the inner surface of annular seal member 20 slidably contacts the outer surface of cylindrical portion 14a of driven side yoke 13. The outer surface of cylindrical portion 14a is applied with the same metal plating M4.

Furthermore, in this embodiment E-13, a third annular seal member 26 is employed which is coaxially arranged beside annular seal member 20 as shown.

That is, third annular seal member 26 is tightly disposed on the inner surface of cylindrical portion 7c of cylindrical casing 7, and the inner surface of third annular seal member 26 slidably contacts the metal-plated outer surface of cylindrical portion 14a of driven side yoke 13.

As shown, between the two annular seal members 20 and 26, there is defined an annular space that is filled with grease "G".

Due to provision of additional seal member 26, the muddy water blocking function possessed by the labyrinth structure "C" is much promoted. Furthermore, due to the metal-plating M4 applied to the outer surfaces of the cylindrical portion 11b of stub shaft 9 and cylindrical portion 14a of driven side yoke 13, the three annular seal members 21, 20 and 26 can exhibit a satisfied sealing function for a long time while protecting radial ball bearing unit 22 from muddy water.

Figure 17:
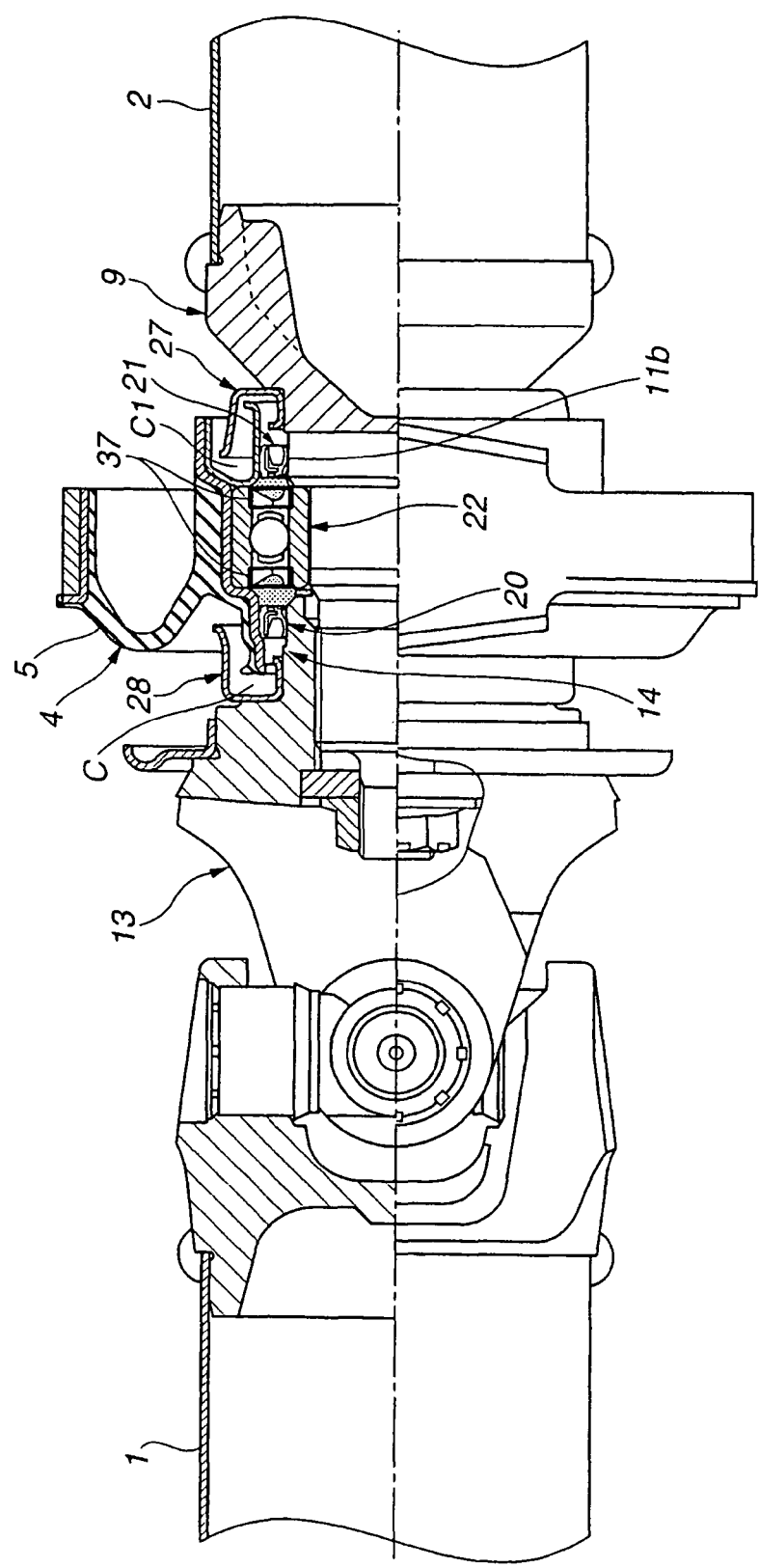
FIG. 17 is a view similar to FIG. 1, but showing a $14^{th}$ embodiment of the present invention.
Figure 18:
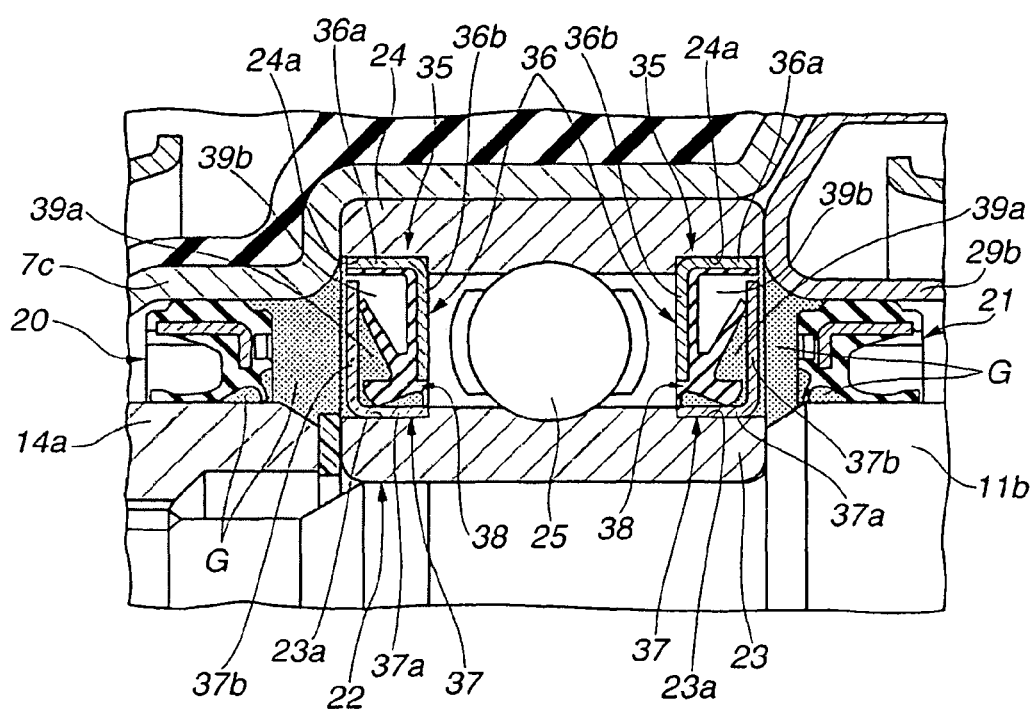
FIG. 18 is an enlarged sectional view of an essential part of the support device of the $14^{th}$ embodiment of FIG. 17.

Referring to FIGS. 17 and 18, there is shown a support device E-14 of a 14$^{th}$ embodiment of the present invention.

As is best seen from FIG. 18, in this embodiment E-14, radial ball bearing unit 22 is modified so that it includes two annular seal structures 35.

As shown, two annular seal structures 35 are coaxially arranged at axially opposed sides of radial ball bearing unit 22 having balls 25 of bearing unit 22 placed therebetween.

Each annular seal structure 35 comprises an annular outer holder 36 that is tightly disposed in an annular recess 24a formed in an inner surface of outer race 24 of bearing unit 22, an annular inner holder 37 that is tightly disposed in an annular recess 23a formed in an outer surface of inner race 23 of bearing unit 22, and an annular seal member 38 of rubber material that is bonded through vulcanization to an inner surface of outer annular holder 36 and has lip portions that are in contact with an inner surface of annular inner holder 37. A suitable amount of grease "G" is received in a space 39a defined in annular seal structure 35 keeping the other space 39b empty, as shown. Of course, the other space 39b may be filled with grease "G".

As shown, each annular outer holder 36 has an L-shaped cross section and includes a cylindrical outer portion 36a and an annular wall portion 36b that intersect at right angles, and each annular inner holder 37 has also an L-shaped cross section and includes a cylindrical inner portion 37a and an annular wall portion 37b that intersect at right angles.

In this 14$^{th}$ embodiment, annular seal member 21 is tightly disposed on the inner surface of inner cylindrical portion 29b of third dust cover 29, and the other annular seal member 20 is tightly disposed on the inner surface of cylindrical portion 7c of cylinder casing 7.

Thus, the outer surface of cylindrical portion 11b of stub shaft 9 and the outer surface of cylindrical right end portion 14a of driven side yoke 13 are in slidable contact with the inner surfaces of annular seal members 21 and 20, as shown.

If desired, a metal plating may be applied to each of the outer surface of cylindrical portion 11b of stub shaft 9 and the is outer surface of cylindrical right end portion 14a of driven side yoke 13 for achieving an adequate sealing contact with the inner surfaces of annular seal members 21 and 20. Of course, in place of such metal plating, other rust-proofing materials, such as those as mentioned hereinabove may be used.

Due to provision of two annular seal structures 35 incorporated with radial ball bearing unit 22, muddy water blocking function is assuredly obtained.

Figure 19:
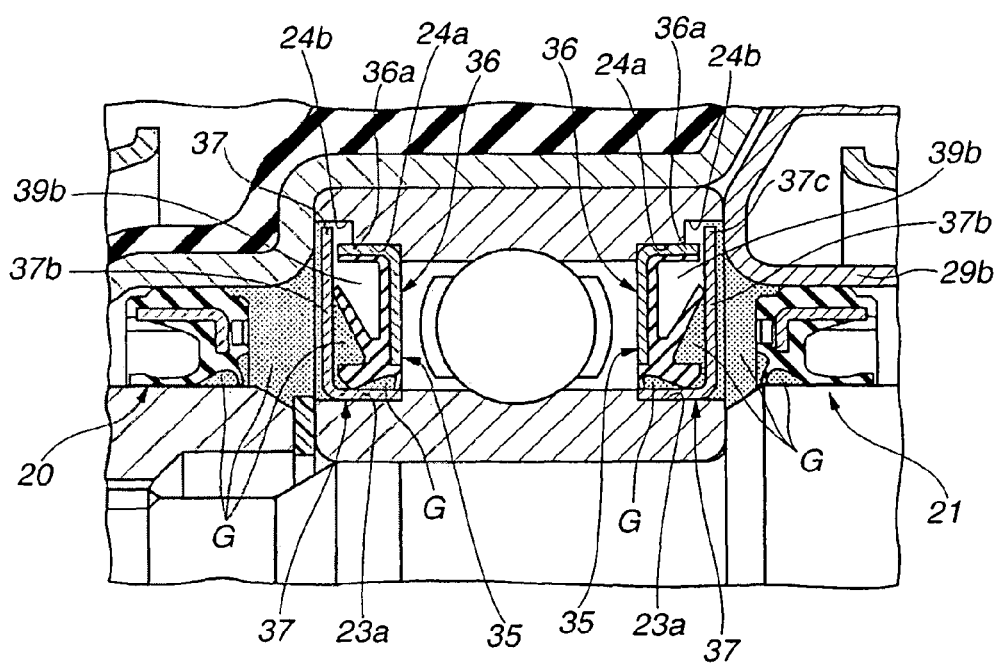
FIG. 19 is a view similar to FIG. 18, but showing a $15^{th}$ embodiment of the present invention.

Referring to FIG. 19, there is shown a support device E-15 of a 15$^{th}$ embodiment of the present invention.

Since this embodiment E-15 is similar to the above-mentioned 14$^{th}$ embodiment of FIG. 18, only portions that are different from those of the 14$^{th}$ embodiment will be described in the following.

In this 15$^{th}$ embodiment E-15, a larger diameter annular recess 24b is formed in the inner surface of outer race 24 beside the recess 24a, and a peripheral portion 37c of annular wall portion 37b of annular inner holder 37 projects into larger diameter annular recess 24b. Of course, the spaces 39b may be filled with grease "G".

With the above-mentioned construction, a labyrinth structure is constituted, which comprises a complicated path defined by peripheral portion 37c, larger diameter annular recess 24b and cylindrical outer portion 36a of annular outer holder 36.

Accordingly, due to provision of two annular seal structures 35 that have each the above-mentioned labyrinth structure, the muddy water blocking function is assuredly obtained.

Figure 20:
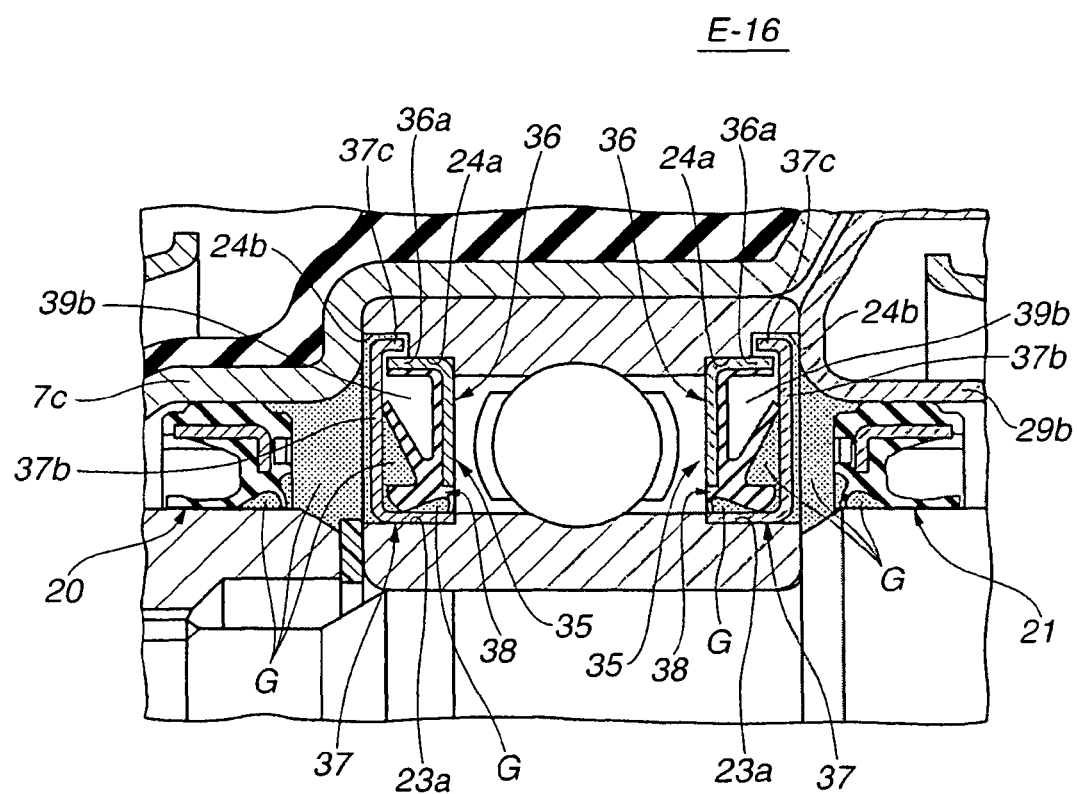
FIG. 20 is a view similar to FIG. 18, but showing a $16^{th}$ embodiment of the present invention.

Referring to FIG. 20, there is shown a support device E-16 of a 16$^{th}$ embodiment of the present invention.

Since this embodiment E-16 is similar to the above-mentioned 15th embodiment E-15, only portions that are different from those of the 15th embodiment E-15 will be described in the following.

As shown, in this embodiment E-16, peripheral portion 37c of annular wall portion 37b of annular inner holder 37 is bent to surround a leading end of cylindrical outer portion 36a of annular outer holder 36. The spaces 39b may be filled with grease "G".

With the above-mentioned construction, the labyrinth structures possessed by the two annular seal structures 35 are much complicated, and thus, muddy water blocking function is assuredly obtained.

Figure 21:
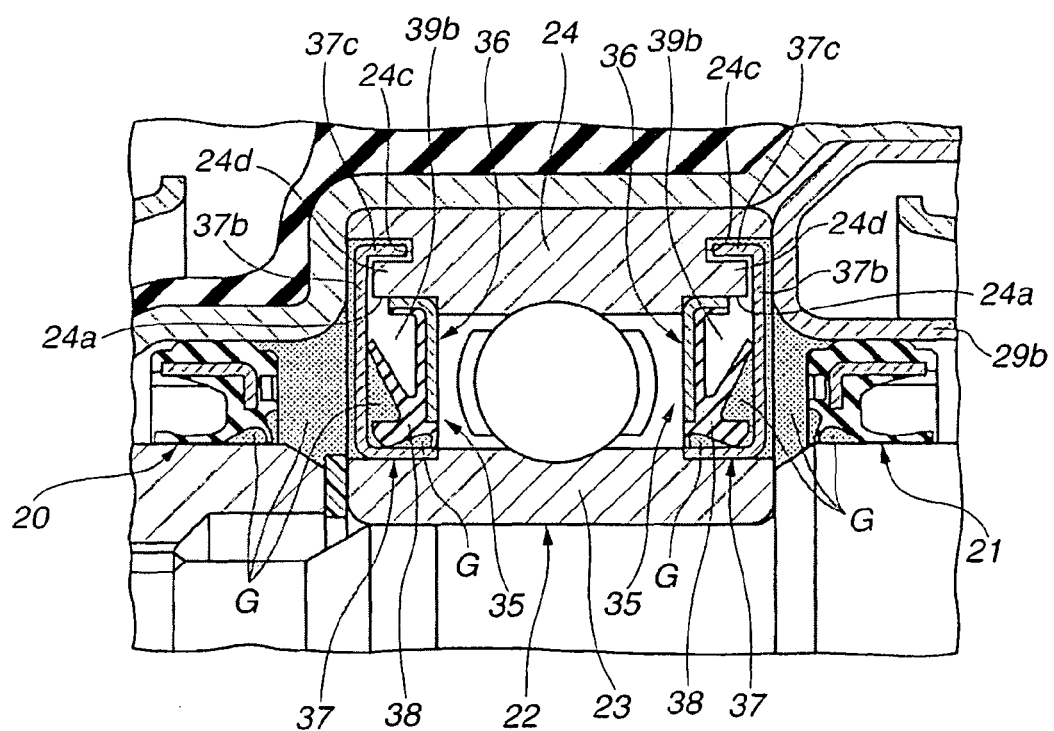
FIG. 21 is a view similar to FIG. 18, but showing a $17^{th}$ embodiment of the present invention.

Referring to FIG. 21, there is shown a support device E-17 of a 17th embodiment of the present invention.

Since this embodiment E-17 is similar to the above-mentioned 16th embodiment E-16, only portions that are different from those of 16th embodiment will be described in the following.

In this embodiment E-17, an annular space 24c into which the bent peripheral part 37c of annular wall portion 37b of annular inner holder 37 projects is provided in outer race 24 of radial ball bearing unit 22 leaving an annular projection 24d between the annular space 24c and annular recess 24a, as shown. The spaces 39b may be filled with grease "G".

With the above-mentioned construction, the labyrinth structures become much complicated, and thus, muddy water blocking function is assuredly obtained.

Figure 22:
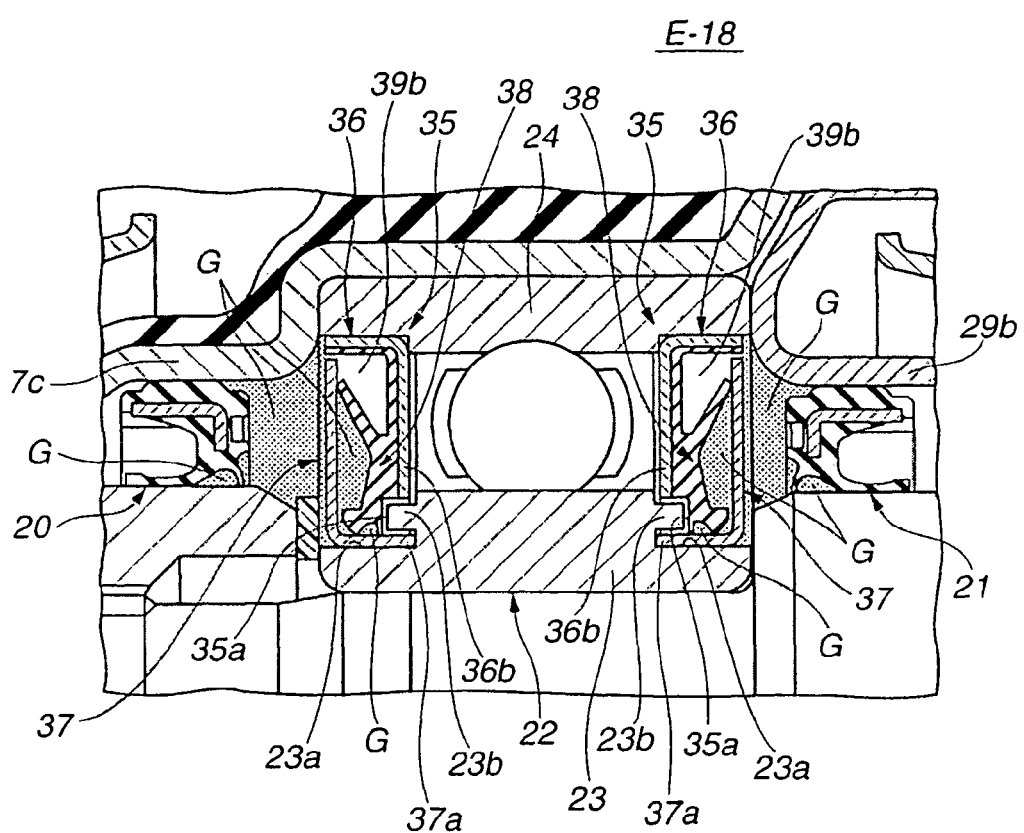
FIG. 22 is a view similar to FIG. 18, but showing an $18^{th}$ embodiment of the present invention.

Referring to FIG. 22, there is shown a support device E-18 of an 18th embodiment of the present invention.

Since this embodiment E-18 is similar to the above-mentioned 14th embodiment E-14 of FIG. 18, only portions that to are different from those of 14th embodiment E-14 will be described in the following.

As shown, in this embodiment E-18, a deeper annular recess 23a is provided under an annular projection 23b, and cylindrical inner portion 37a has a leading end projected into the deeper annular recess 23a. For spacedly receiving annular projection 23b, annular seal structure 35 is formed with an annular recess 35a. The spaces 39b may be filled with grease "G".

With the above-mentioned construction, a labyrinth structure is constituted, which comprises a complicated path defined by annular projection 23b and an inner wall of annular recess 35a.

Accordingly, due to provision of two annular seal structures 35 that have each the above-mentioned labyrinth structure, the muddy water blocking function is assuredly obtained.

Figure 23:
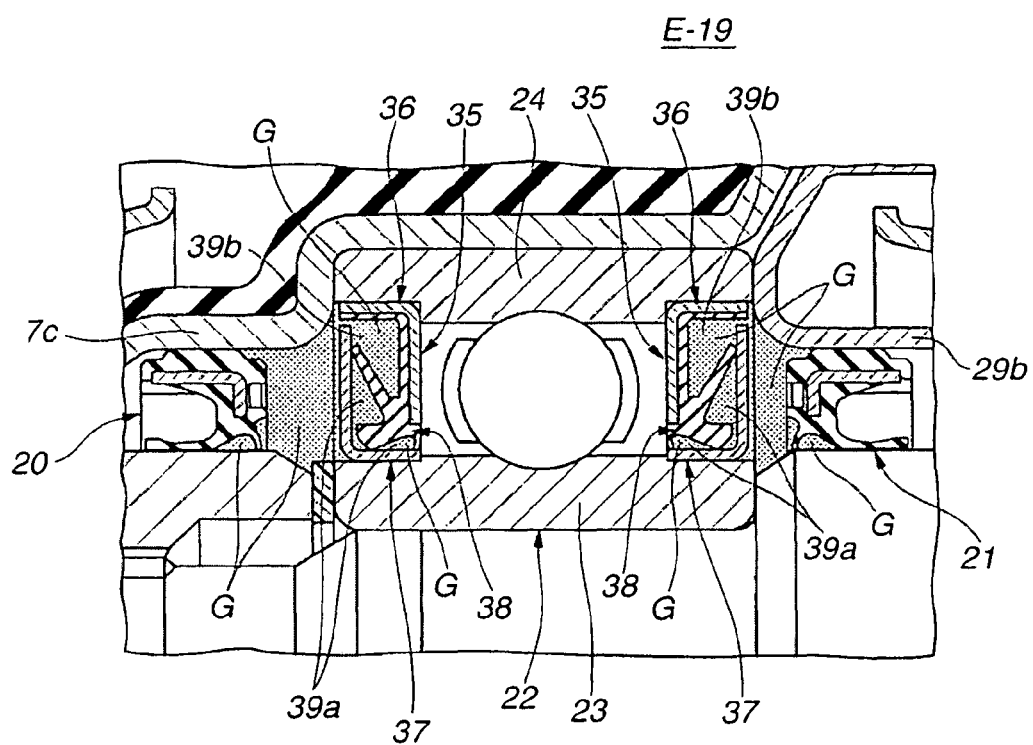
FIG. 23 is a view similar to FIG. 18, but showing a $19^{th}$ embodiment of the present invention.

Referring to FIG. 23, there is shown a support device E-19 of a 19th embodiment of the present invention.

Since this embodiment E-19 is similar to the above-mentioned 14th embodiment E-14 of FIG. 18, only portions that are different from those of 14th embodiment E-14 will be described in the following.

As shown, in this embodiment E-19, inner space (39a+39b) defined by annular outer holder 36 and annular inner holder 37 is entirely filled with grease "G".

Due to the above-mentioned construction, the muddy water blocking function is assuredly obtained.

Figure 24:
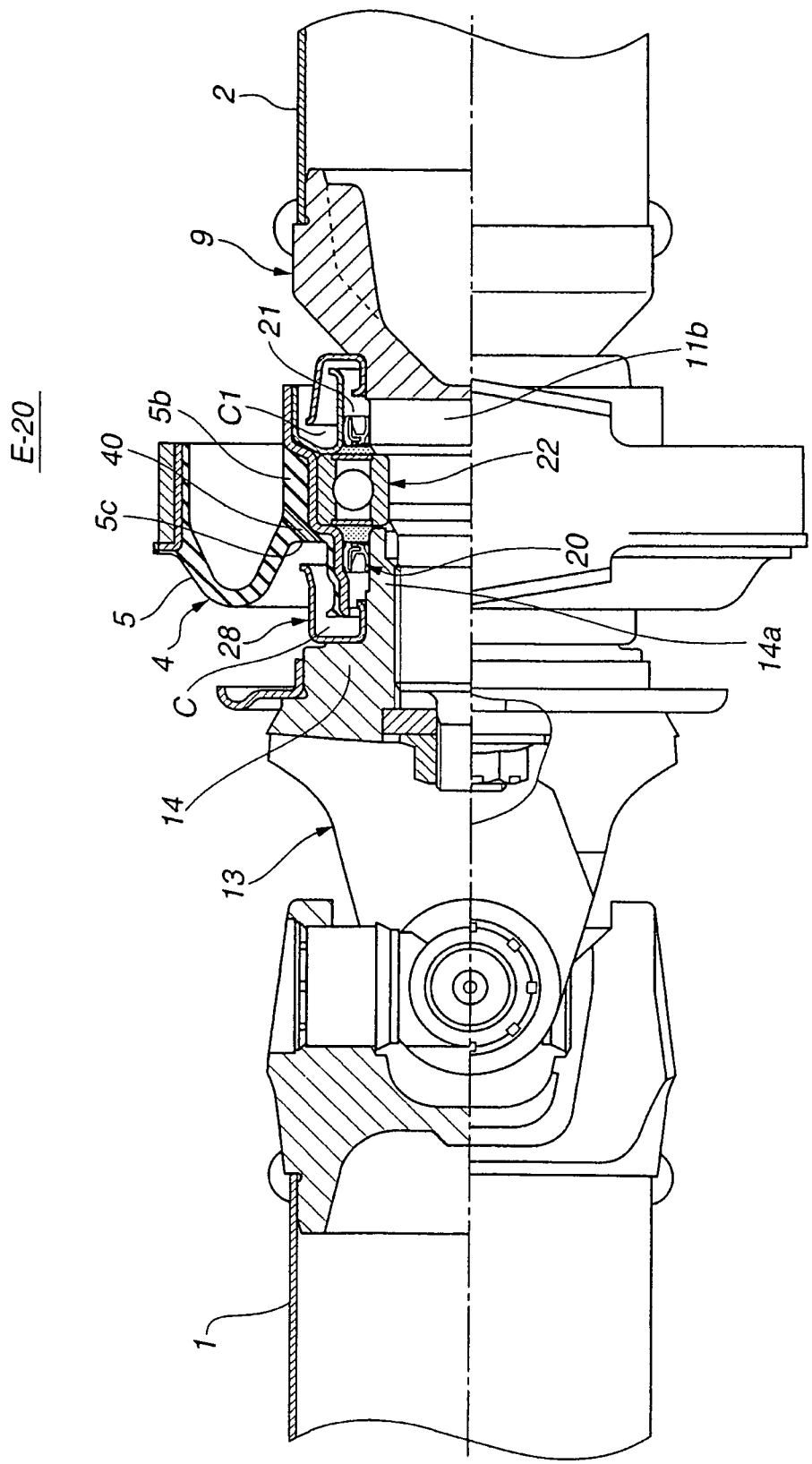
FIG. 24 is a view similar to FIG. 1, but showing a $20^{th}$ embodiment of the present invention.
Figure 25:
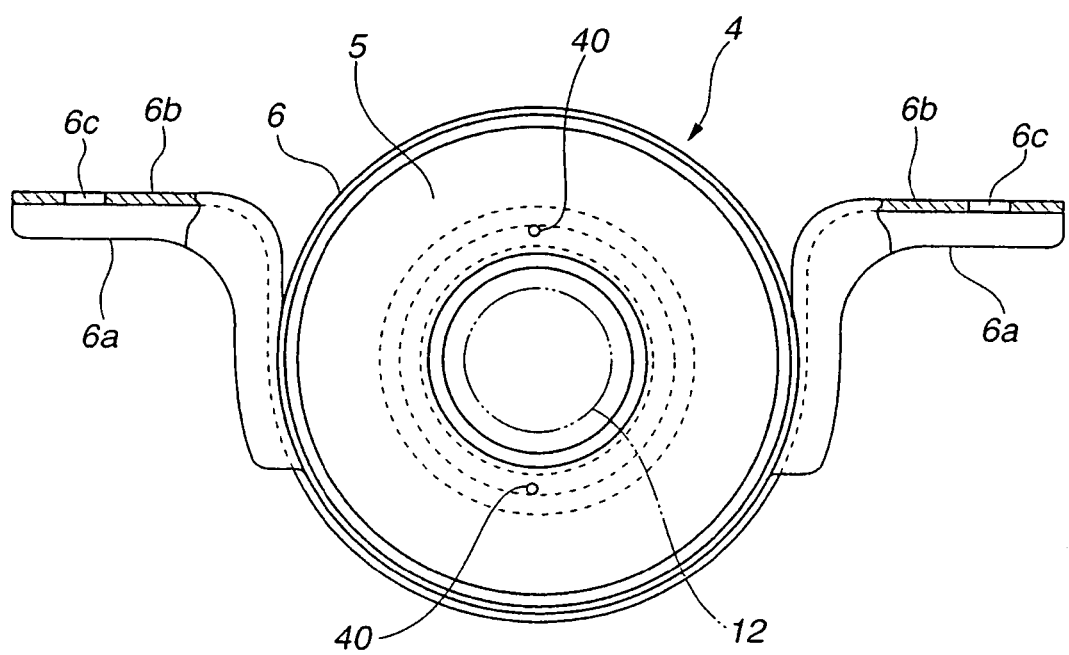
FIG. 25 is a partially sectioned front view of the support device of the $20^{th}$ embodiment of the present invention.
Figure 26:
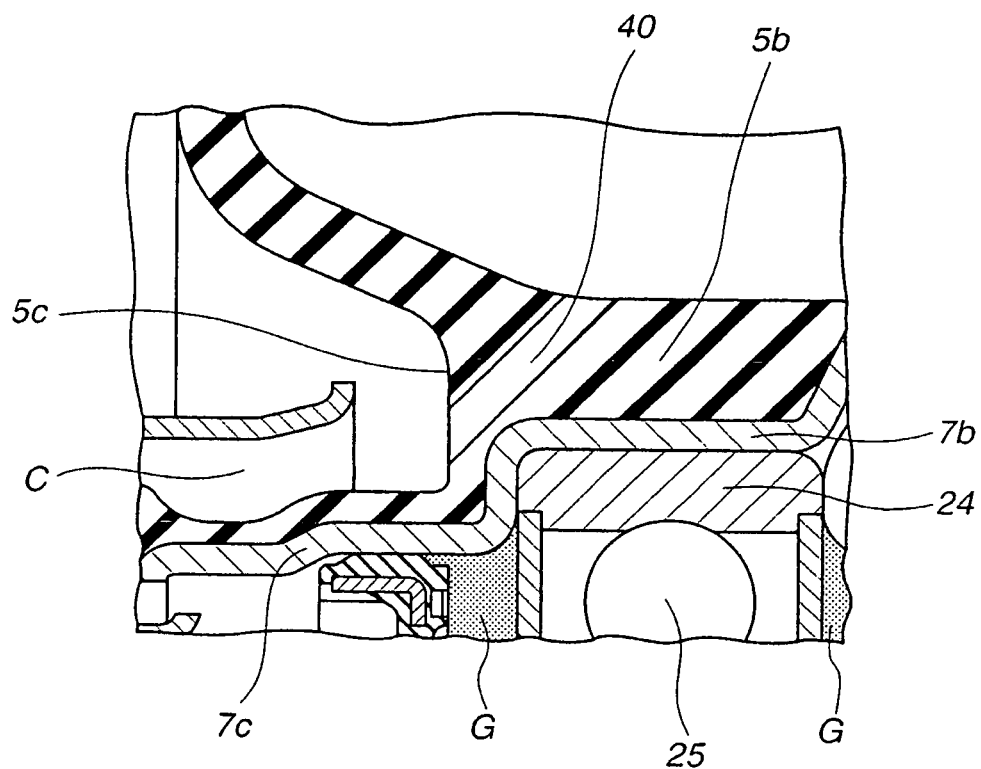
FIG. 26 is an enlarged sectional view of an essential part of the support device of the $20^{th}$ embodiment of FIG. 25.

Referring to FIGS. 24, 25 and 26, there is shown a support device E-20 of a 20th embodiment of the present invention.

Since this embodiment E-20 is similar to the above-mentioned first embodiment E-1 of FIGS. 1, 2 and 3, only portions that are different from those of first embodiment E-1 will be described in the following.

However, as is shown in FIG. 24, in this embodiment, the outer surface of cylindrical portion 11b of stub shaft 9 and the outer surface of cylindrical right end portion 14a of driven side yoke 13 are not rust-proofing surfaces. However, if desired, such rust-proofing surfaces may be employed.

As is seen from FIGS. 24, 25 and 26, particularly FIGS. 25 and 26, in this 20th embodiment E-20, annular elastic member 5 installed inside annular bracket 6 is formed at diametrically opposed portions with respective drain ports 40.

As is understood from FIGS. 24 and 26, each drain port 40 extends in inner annular part 5b of annular elastic member 5 from a part 5c that faces an entrance of the complicated path of labyrinth structure "C" to a part that faces outer annular part 5a of annular elastic member 5.

Due to provision of such drain ports 40, under cruising of an associated motor vehicle, muddy water splashed on part 5c is drained out through the drain ports 40 with the aid of suction or negative pressure effect produced in the annular groove of annular elastic member 5. Thus, the muddy water blocking effect is effectively carried out.

Figure 27:
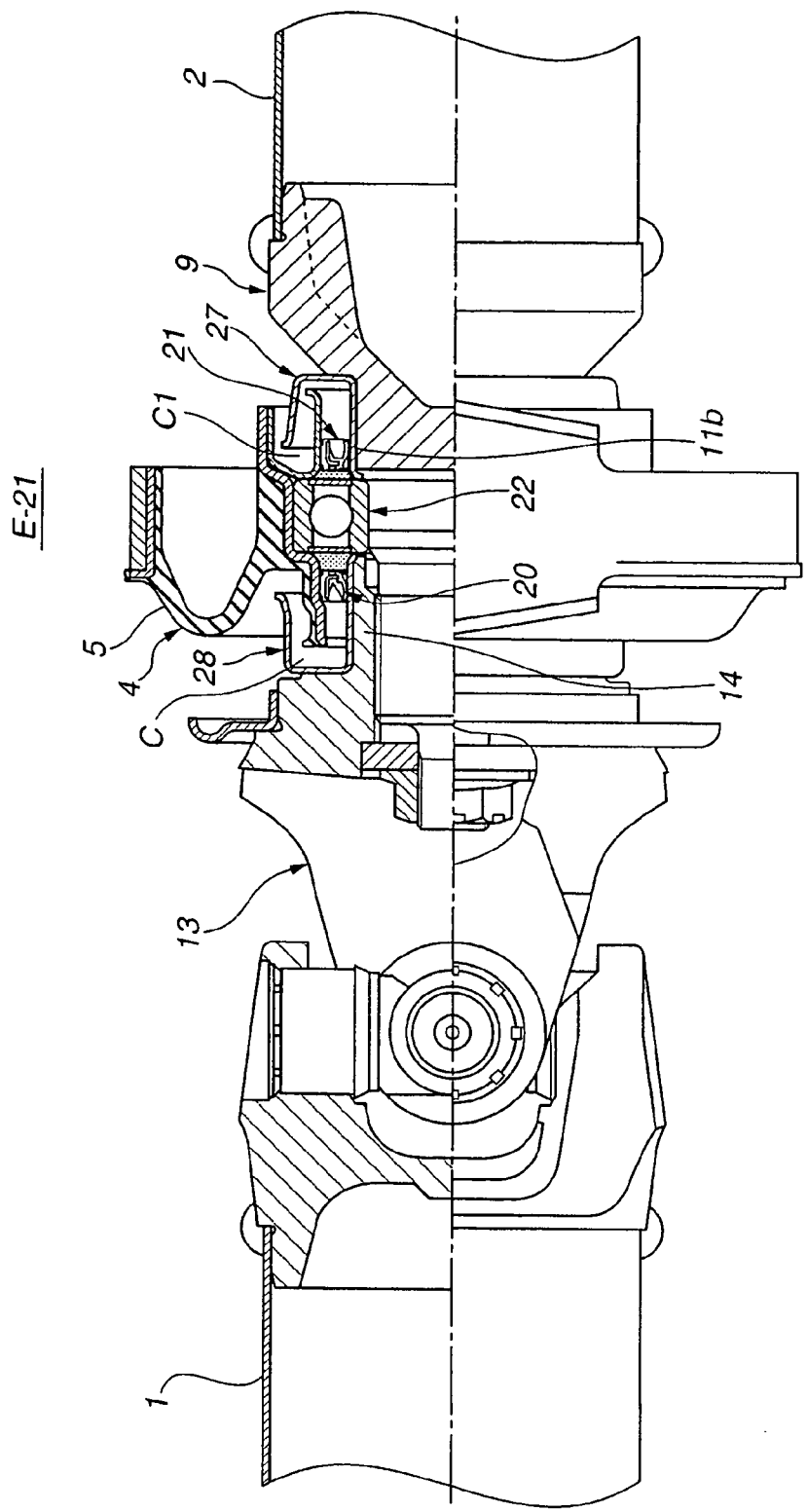
FIG. 27 is a view similar to FIG. 1, but showing a $21^{st}$ embodiment of the present invention.
Figure 28:
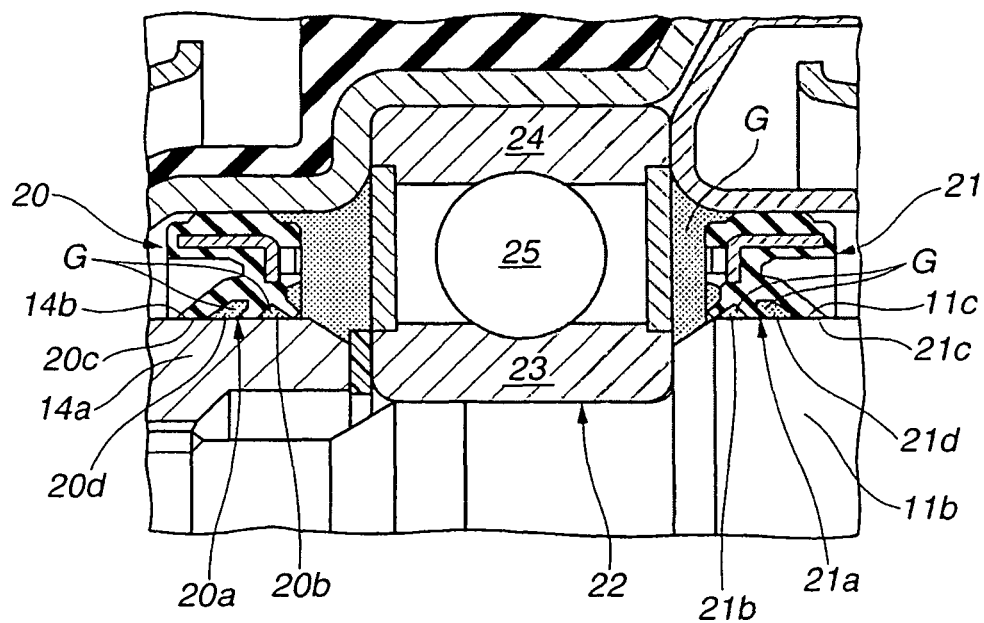
FIG. 28 is an enlarged sectional view of an essential part of the support device of the $21^{st}$ embodiment of FIG. 27.

Referring to FIGS. 27 and 28, there is shown a support device E-21 of a 21st embodiment of the present invention.

Since this embodiment E-21 is similar to the above-mentioned 20th embodiment of FIGS. 24 to 26, only portions that are different from those of 20th embodiment will be described in the following.

As is seen from FIG. 28, in the 21st embodiment, each annular seal member 21 or 20 is formed with a pair of lip portions 21c or 20c, each pair being in contact with the outer surface of cylindrical portion 11b of stub shaft 9 or the outer surface of cylindrical right end portion 14a of driven side yoke 13. Each pair of lip portions 21c or 20c put therebetween a recess 21d or 20d in which the grease "G" is held.

Due to provision of lip portions 21c and 20c, the sealing function of the two annular seal members 21 and 20 against the respective outer surfaces of cylindrical portion 11b and cylindrical right end portion 14a is increased while reducing a friction resistance produced between the respective outer surfaces and the cylindrical inner surfaces of the two annular seal members 21 and 20.

Figure 29:
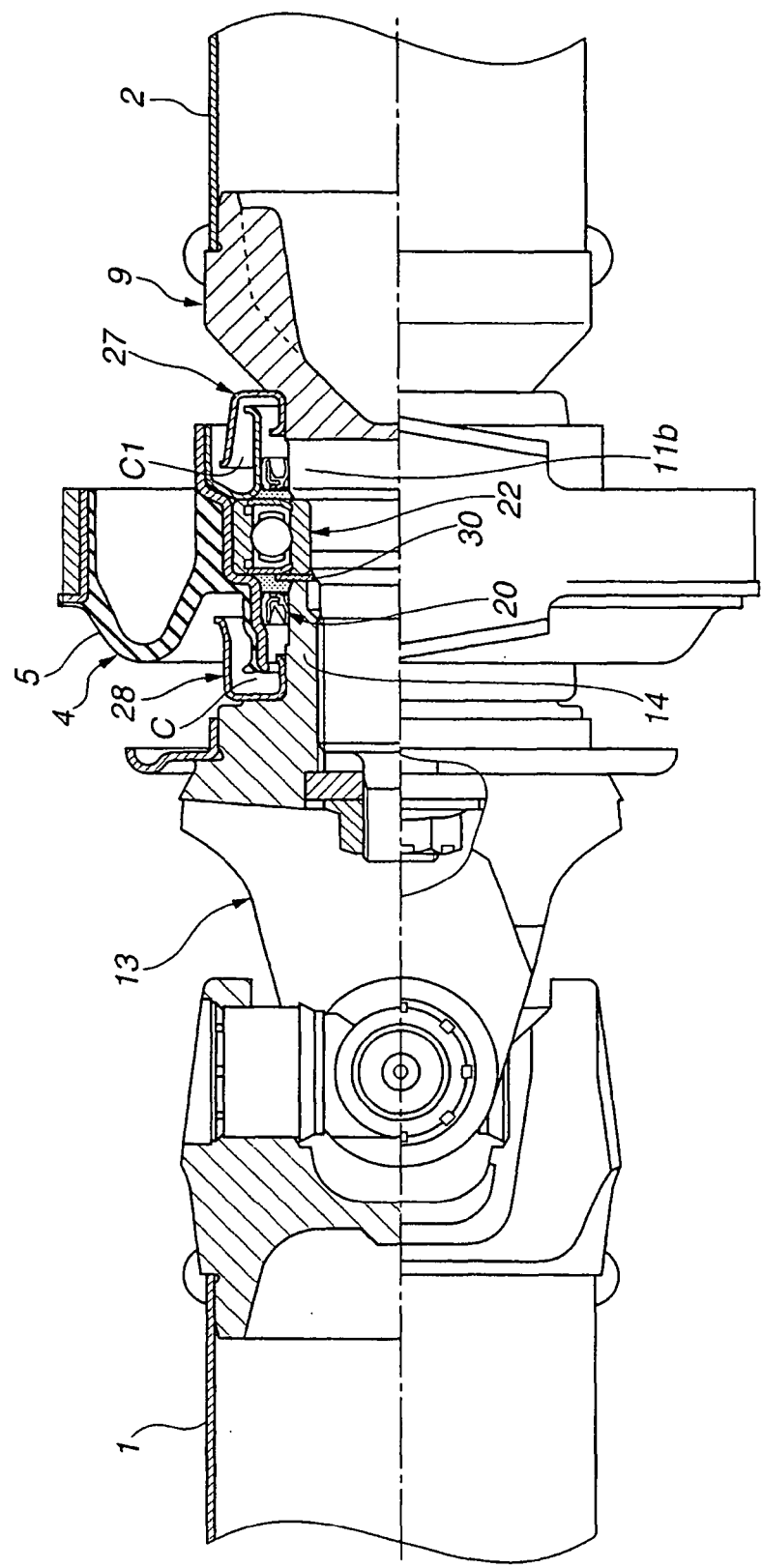
FIG. 29 is a view similar to FIG. 1, but showing a $22^{nd}$ embodiment of the present invention.
Figure 30:
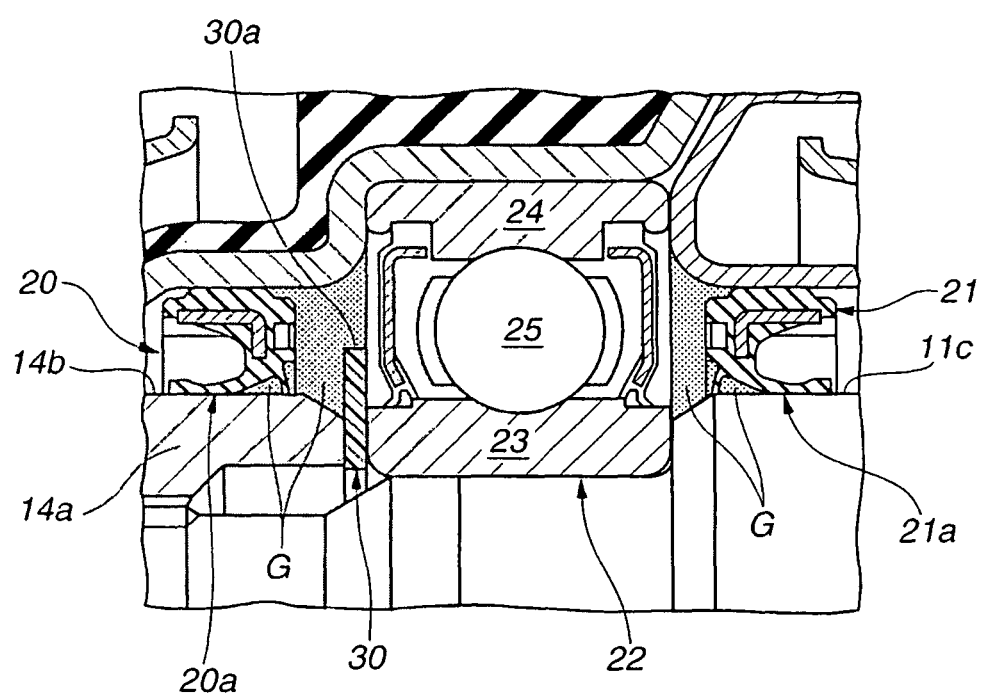
FIG. 30 is an enlarged sectional view of an essential part of the support device of the $22^{nd}$ embodiment of FIG. 29.

Referring to FIGS. 29 and 30, there is shown a support device E-22 of a 22nd embodiment of the present invention.

As is well shown in FIG. 30, in this embodiment E-22, an annular plate 30 of engineering plastic is tightly put between a end surface of right end portion 14a of driven side yoke 13 and a left end surface of inner race 23 of radial ball bearing unit 22. As shown, annular plate 30 has a peripheral portion 30a that project radially outward into an annular space (no numeral) defined between annular seal member 20 and radial ball bearing unit 22.

Due to provision of annular plate 30, the muddy water blocking function of the complicated path "C" of labyrinth structure is much promoted.

Figure 31:
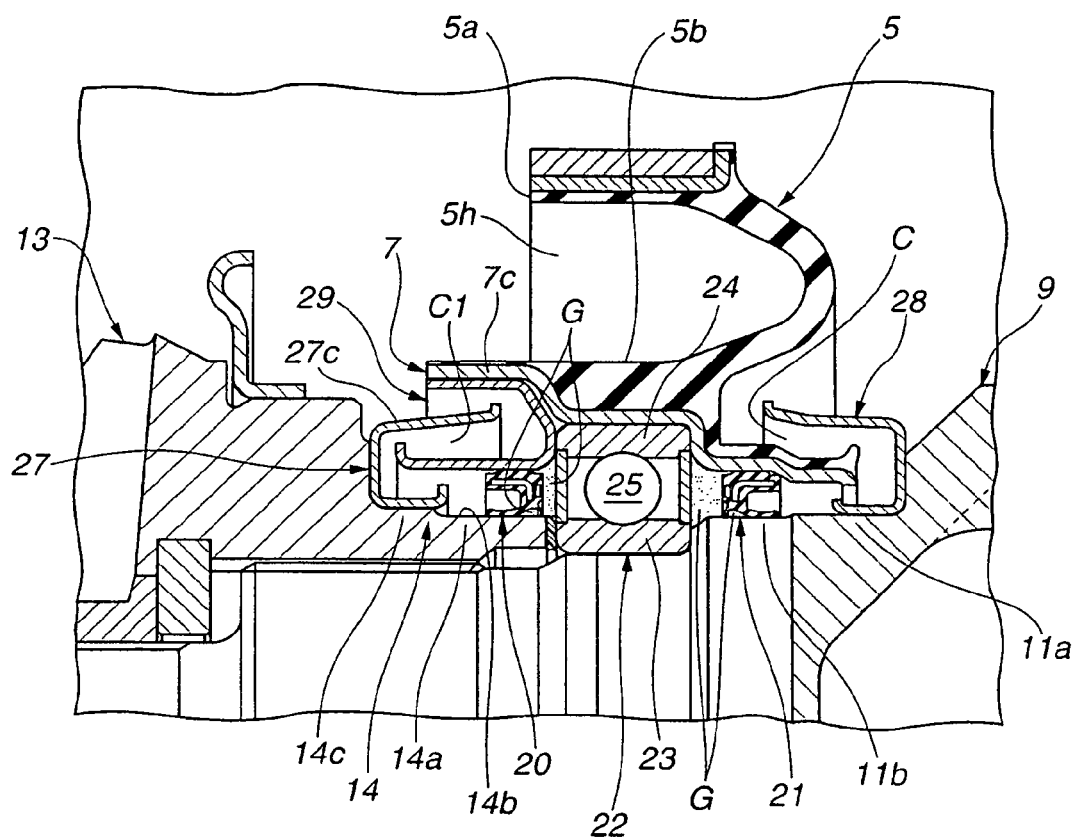
FIG. 31 is an enlarged sectional view of an essential part of the support device of a $23^{rd}$ embodiment of the present invention.

Referring to FIG. 31, there is shown a support device E-23 of a 23rd embodiment of the present invention.

As shown, in this embodiment E-23, annular elastic member 5 is reversely arranged, so that an annular recess 5h defined by outer annular part 5a, inner annular part 5b and the turn-up part (no numeral) at which the two parts 5a and 5b are integrally connected faces forward, that is, toward drive shaft 1 (see FIG. 29).

Furthermore, in this embodiment E-23, cylindrical casing 7 is also reversely arranged, so that a larger diameter portion 7c of casing 7 faces forward, that is, toward drive shaft 1. Furthermore, first, second and third annular dust covers 27, 28 and 29 are also reversely arranged. That is, first annular dust cover 27 is tightly disposed on the smaller diameter right portion 14c of driven side yoke 13, and second annular dust cover 28 is tightly disposed on cylindrical portion 11a of stub shaft 9, and third annular dust cover 29 is tightly disposed on an inner surface of larger diameter portion 7c of cylindrical casing 7 while covering outer cylindrical portion 27c of first annular dust cover 27, as shown. As shown, first and third annular dust covers 27 and 29 are placed before annular elastic member 5.

Also in this 23$^{rd}$ embodiment, the front and rear labyrinth structures define respective complicated paths "C1" and "C" like in the above-mentioned embodiments, the muddy water blocking function is assuredly achieved. Since the forward facing annular recess 5h tends to collect such muddy water under cruising of the vehicle, the complicated path "C1" is relived from treating a larger amount of muddy water.

Figure 32:
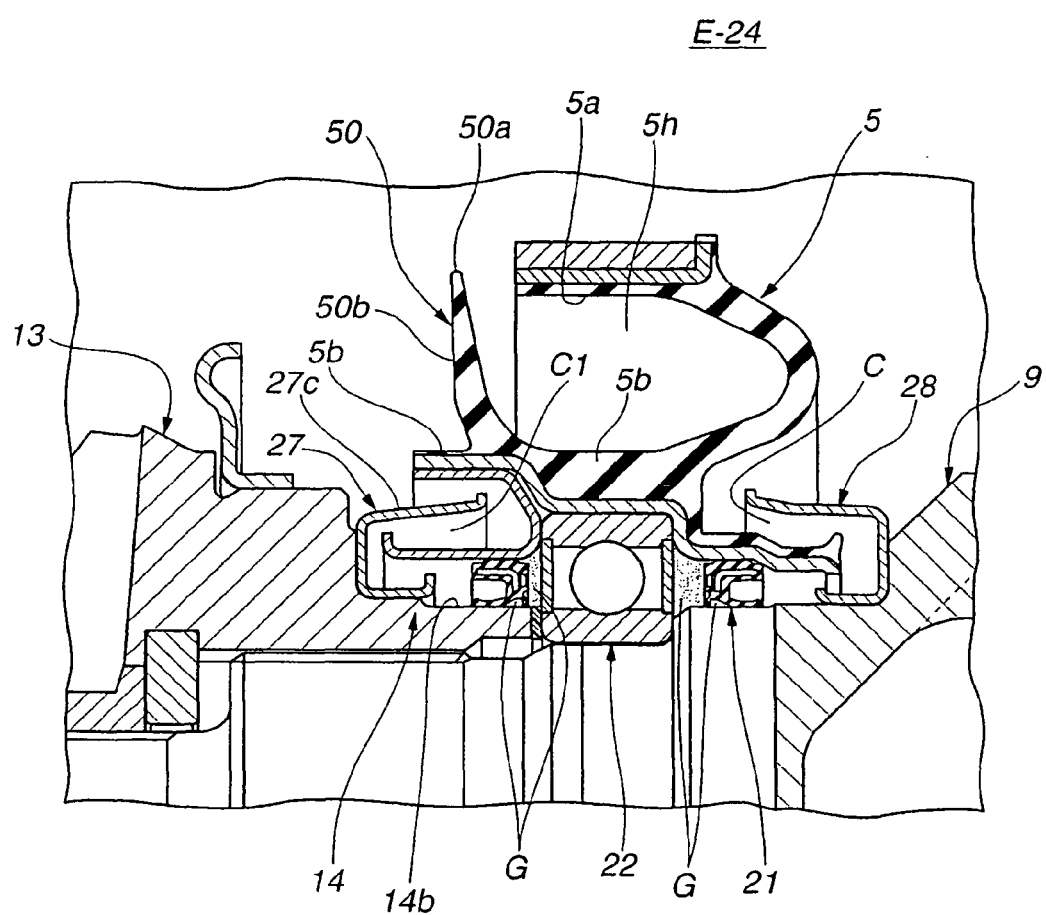
FIG. 32 is a view similar to FIG. 31, but showing a $24^{th}$ embodiment of the present invention.
Figure 33:
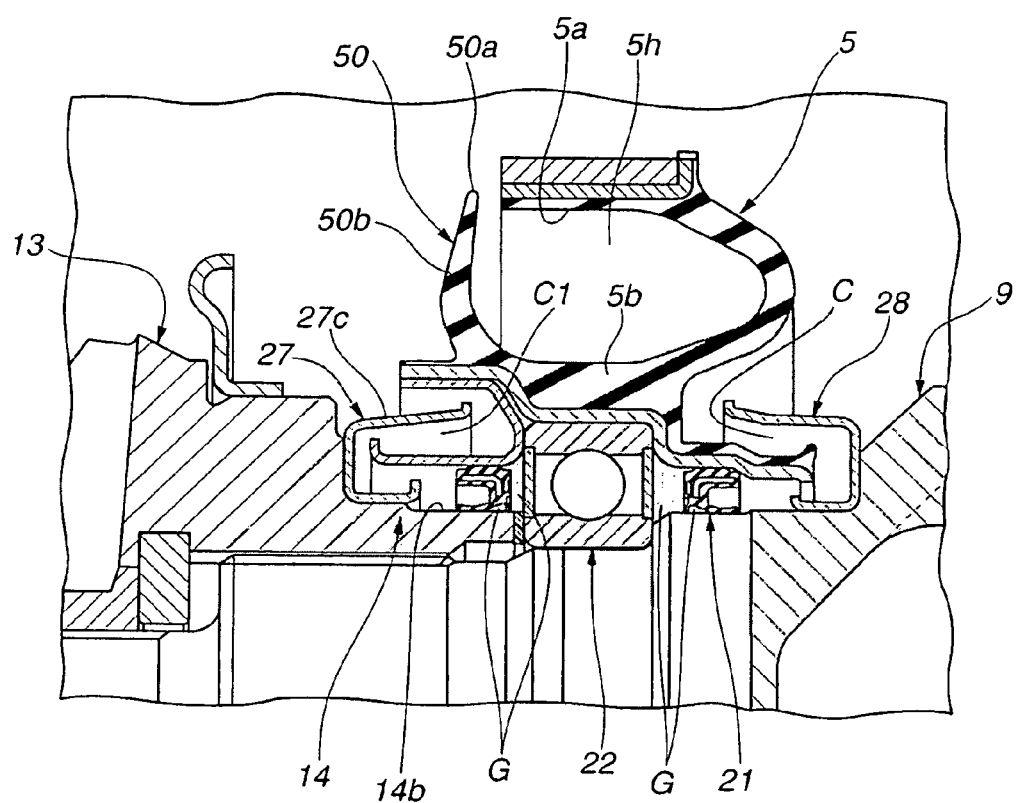
FIG. 33 is a view similar to FIG. 32, but showing a different condition of the support device of the $24^{th}$ embodiment.

Referring to FIGS. 32 and 33, there is shown a support device E-24 of a 24$^{th}$ embodiment of the present invention.

Since this embodiment E-24 is similar to the above-mentioned 23$^{rd}$ embodiment E-23 of FIG. 31, only portions that are different from those of the 23$^{rd}$ embodiment will be described in the following.

As shown in FIG. 32, in this embodiment E-24, inner annular part 5b has at a left (or front) end thereof an annular flange portion 50 that expands radially outward. As shown, a peripheral portion 50a of annular flange portion 50 expands radially outward beyond outer annular part 5a of annular elastic member 5.

With provision of such annular flange portion 50, annular recess 5h of annular elastic member 5 is relieved from collecting a larger amount of muddy water and the like. Actually, as is seen from FIG. 33, under cruising of the vehicle, annular flange portion 50 is flexed rearward, that is, toward a mouth portion of annular recess 5h due to work of wind pressure applied to the flange portion 50, and thus narrows and finally closes the mouth portion of annular recess 5h. Even when the amount of muddy water dropping onto outer cylindrical portion 27c of first annular dust cover 27 increases because of provision of annular flange portion 50, rotation of first annular dust cover 27 together with the propeller shaft (9+13) forces the water to scatter radially outward from outer cylindrical portion 27c.

Figure 34:
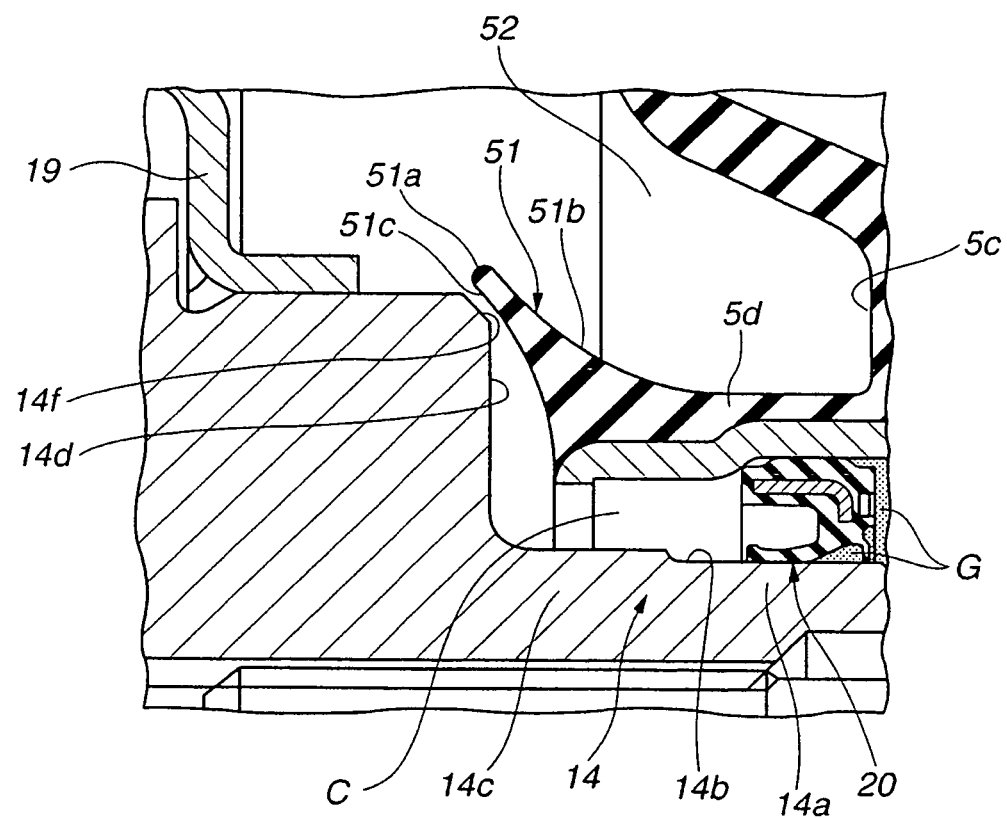
FIG. 34 is an enlarged sectional view similar to FIG. 32, but showing a $25^{th}$ embodiment of the present invention.
Figure 35:
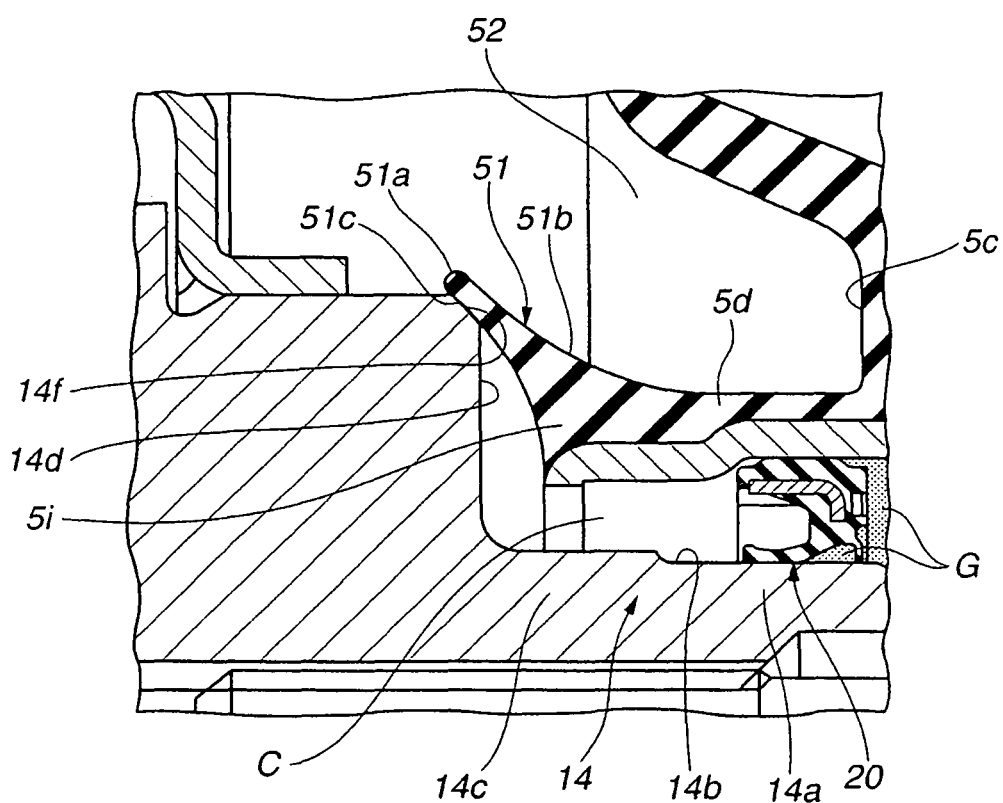
FIG. 35 is a view similar to FIG. 34, but showing a different condition of the support device of the $25^{th}$ embodiment; and, FIG. 36 is a view similar to FIG. 35, but showing a $26^{th}$ embodiment of the present invention.

Referring to FIGS. 34 and 35, there is shown a support device E-25 of a 25$^{th}$ embodiment of the present invention.

Since this embodiment E-25 is similar to the above-mentioned 20$^{th}$ embodiment E-20 of FIGS. 24, 25 and 26, only portions that are different from those of the 20$^{th}$ embodiment will be described in the following.

In this 25$^{th}$ embodiment E-25, there is no member that corresponds to second annular dust cover 28 employed in the 20$^{th}$ embodiment E-20. That is, as is seen from FIG. 34, in this embodiment E-25, cylindrical left portion 5d of annular elastic member 5 has a tapered flange portion 51 that extends toward a chamfered edge 14f of annular back portion 14d of driven side yoke 13. Actually, a leading end 51a of flange portion 51 extends radially outward beyond the chamfered edge 14f. Flange portion 51 has a smoothly curved outer surface 51b and a smoothly curved inner surface 51c.

As will be imaged from FIG. 24 as compared with FIG. 34, in this embodiment E-25, an annular recess 52 is inevitably defined by the turn-up part of annular elastic member 5, annular flat surface 5c and cylindrical left portion 5d, which faces forward, that is, toward driven side yoke 13.

As will be understood from FIG. 35, under cruising of the vehicle, flange portion 51 is forced to contact against chamfered edge 14f due to work of a wind pressure applied to flange portion 51 from a back position. Actually, the wind is forced to turn back in annular recess 52 and applied to flange portion 51. Thus, the mouth of the complicated path "C" is closed and thus annular seal member 20 and a left part of radial ball bearing unit 22 are protected from muddy water.

Figure 36:
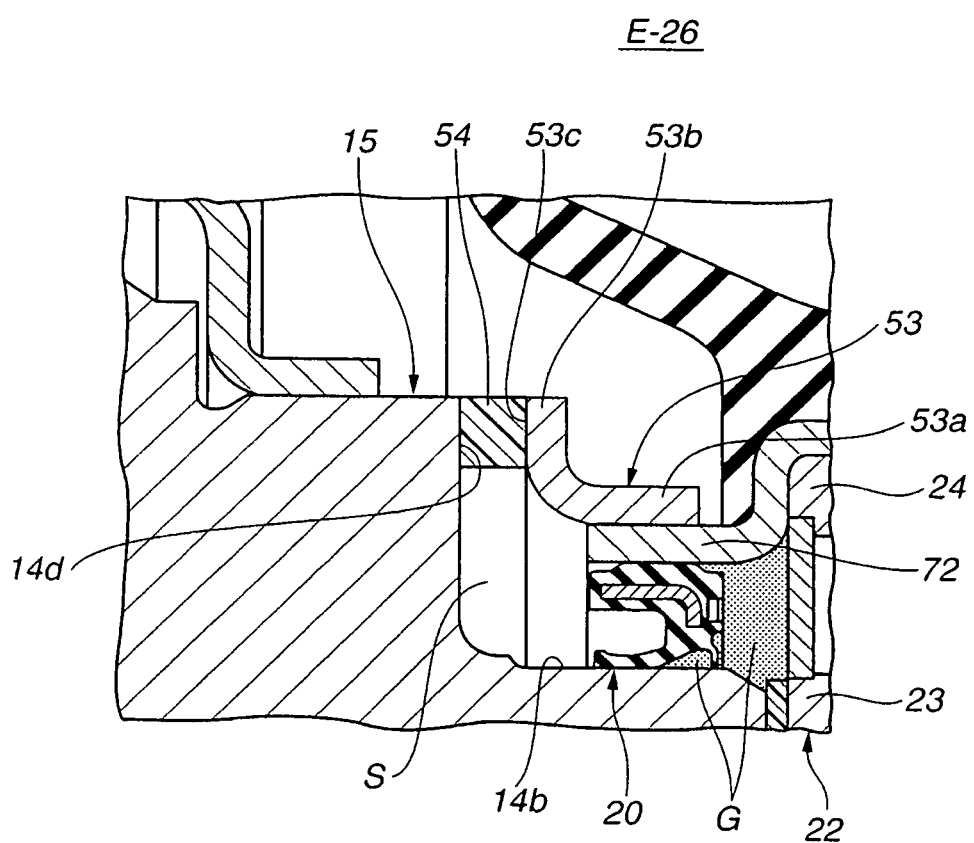

Referring to FIG. 36, there is shown a support device E-26 of a 26$^{th}$ embodiment of the present invention.

Since this embodiment E-26 is similar to the above-mentioned 25$^{th}$ embodiment E-25 of FIGS. 34 and 35, only portions that are different from the 25$^{th}$ embodiment E-25 will be described in the following.

As shown in FIG. 36, in this 26$^{th}$ embodiment E-26, annular elastic member 5 has no portion that corresponds to cylindrical left portion 5d with tapered flange portion 51.

In this embodiment E-26, an annular metal retainer 53 is tightly disposed on cylindrical portion 7c of cylindrical casing 7 and an annular seal member 54 is tightly put between a raised flange part 53b of metal retainer 53 and a left end surface of annular back portion 14d of driven side yoke 13. More specifically, annular metal retainer 53 is constructed of a ferrous metal and has a generally L-shaped cross section including an annular base part 53a tightly disposed on the cylindrical portion 7c, and the flange part 53b pressed against annular seal member 54.

Annular seal member 54 is constructed of for example an engineering plastic and has a right end surface fixed to a left surface 53c of flange part 53b and a left end surface abutting against the left end surface of annular back portion 14d.

If desired, the annular retainer 53 and annular seal member 54 may be made of an engineering plastic and molded in one piece. Furthermore, if desired, the annular seal member 54 may constructed of an elastic material, such as rubber material or the like.

Due to provision of annular metal retainer 53 and annular seal member 54 that are arranged and united in the above-mentioned manner, a space "S" inevitably provided before annular seal member 20 is closed, and thus the seal member 20 and thus a left part of radial ball bearing unit 22 are protected from muddy water.

In the foregoing description, first and second annular dust covers 27 and 28 have been mentioned as being constructed of a ferrous metal. However, if desired, such dust covers 27 and 28 may be made of an engineering plastic, such as polyacetal resin or the like.

In the foregoing description, the support device of the invention is described to support driven shaft 2. However, if desired, the support device may be used for supporting drive shaft 1.

Although the above description is directed to a support device for a propeller shaft of a motor vehicle, the support device of the present invention is applicable to other rotating shaft.

The entire contents of Japanese Patent Applications 2007-138703 filed May 25, 2007 and 2008-074001 filed Mar. 21, 2008 are incorporated herein by reference.

Although the invention has been described above with reference to the embodiments of the invention, the invention is not limited to such embodiments as described above. Various modifications and variations of such embodiments may be carried out by those skilled in the art, in light of the above description.

What is claimed is:
1. A support device of a propeller shaft, comprising:
an annular bracket adapted to be fixed to a floor member of a vehicle body;
an annular elastic member in the annular bracket;
an annular supporting structure in the annular elastic member and rotatably supporting a cylindrical given portion of the propeller shaft through a ball bearing unit;

first and second annular seal members in front and rear annular spaces, respectively, that are at front and rear sides of the ball bearing unit and between the annular supporting structure and the cylindrical given portion;

annular dust covers disposed on front and rear sides of an outer cylindrical surface of the cylindrical given portion with respect to the ball bearing unit, each of the annular dust covers being constructed and arranged to prevent direct attack of dust against the ball bearing unit;

first and second cylindrical rust-proofing members disposed on the front and rear sides of the outer cylindrical surface of the cylindrical given portion with respect to the ball bearing unit; and an annular plate disposed between an inwardly bent annular flange portion of at least one of the first and second cylindrical rust-proofing members and one axial end of the ball bearing unit, wherein inner cylindrical surfaces of the first and second annular seal members slidably contact the first and second cylindrical rust-proofing members, respectively, wherein each of the first and second cylindrical rust-proofing members extends toward the one axial end of the ball bearing unit, with an engaging portion that includes the inwardly bent annular flange portion put between a flat wall of the cylindrical given portion and the one axial end of the ball bearing unit, and wherein each of the first and second cylindrical rust-proofing members is disposed on a first portion of the cylindrical given portion, the first portion of the cylindrical given portion having a diameter that is less than a diameter of a second portion of the cylindrical given portion.

2. A support device as claimed in claim 1, wherein the first and second cylindrical rust-proofing members comprise stainless steel.

3. A support device as claimed in claim 2, wherein the engaging portion is engaged with the cylindrical given portion to form a press-fit connection of the second cylindrical rust-proofing member to the cylindrical given portion.

4. A support device as claimed in claim 2, wherein each of the first and second cylindrical rust-proofing members is formed at another end thereof with a radially extending portion.

5. A support device as claimed in claim 4, wherein the radially extending portion of the second cylindrical rust-proofing member is provided by bending the another end of the second cylindrical rust-proofing member radially outward.

6. A support device as claimed in claim 1, wherein each of the annular dust covers comprises a substantially U-shaped cross-section.

7. A support device as claimed in claim 1, wherein a maximum diameter of each of the first and second cylindrical rust-proofing members is less than the diameter of the second portion of the cylindrical given portion.

8. A support device as claimed in claim 7, wherein an end of each of the first and second cylindrical rust-proofing members is cylindrical in shape.

9. A support device as claimed in claim 1, wherein a wall thickness of each of the first and second cylindrical rust-proofing members is smaller than a wall thickness of each of the annular dust covers.

* * * * *